(12) United States Patent
Sato

(10) Patent No.: US 11,778,118 B2
(45) Date of Patent: Oct. 3, 2023

(54) INFORMATION PROCESSING APPARATUS FOR INSTALLING APPLICATIONS RELATED TO A PREDETERMINED GROUP

(71) Applicant: CANON KABUSHIKI KAISHA, Tokyo (JP)

(72) Inventor: Junji Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/223,727

(22) Filed: Apr. 6, 2021

(65) Prior Publication Data

US 2021/0321009 A1    Oct. 14, 2021

(30) Foreign Application Priority Data

Apr. 8, 2020   (JP) ................... 2020-070008

(51) Int. Cl.
   *H04N 1/00*   (2006.01)
   *G06F 8/61*   (2018.01)
(52) U.S. Cl.
   CPC ............. *H04N 1/0097* (2013.01); *G06F 8/61* (2013.01); *H04N 1/00938* (2013.01); *H04N 1/00952* (2013.01)
(58) Field of Classification Search
   CPC ............. H04N 1/0097; H04N 1/00938; H04N 1/00973
   See application file for complete search history.

(56) References Cited

U.S. PATENT DOCUMENTS

| | | | | |
|---|---|---|---|---|
| 2015/0095463 | A1* | 4/2015 | Saito | G06F 3/1231 709/219 |
| 2017/0269917 | A1* | 9/2017 | Matsushima | H04N 1/4433 |
| 2017/0272597 | A1* | 9/2017 | Han | G06F 8/61 |
| 2019/0227760 | A1* | 7/2019 | Sato | H04N 1/00517 |
| 2019/0379661 | A1* | 12/2019 | Sato | H04L 63/08 |
| 2021/0092241 | A1* | 3/2021 | Yoshida | H04N 1/4426 |
| 2021/0306473 | A1* | 9/2021 | Inouye | H04N 1/00143 |

FOREIGN PATENT DOCUMENTS

JP    2018018119 A    2/2018

* cited by examiner

*Primary Examiner* — Benjamin O Dulaney
(74) *Attorney, Agent, or Firm* — Canon U.S.A., Inc. IP Division

(57) ABSTRACT

The present information on processing apparatus accepts identification information that identifies a predetermined group of a customer organization; acquire from an installation management server, installation data related to the accepted identification information; execute the installation processing of the information processing apparatus in accordance with the acquired installation data; and, in a case where a registration key for the device management server that manages the information processing apparatus within a network is included in the installation data, when the installation processing is ended, requests registration of the information processing apparatus to the device management server using the registration key.

10 Claims, 20 Drawing Sheets

FIG. 4

LOGIN

TENANT ID : 10001

USERNAME : User01

PASSWORD : ••••••••

( LOGIN )  ( CANCEL )

400

---

INSTALLATION DATA LIST      User01 (TENANT ID : 10001)

( GENERATE NEW )  ( DELETE )

| INSTALLATION DATA NAME | INSTALLATION DATA ID | UPDATE USER | REGISTRATION DESTINATION TENANT ID | | |
|---|---|---|---|---|---|
| ☐ COMPANY A, FOR NEGOTIATION (FOR HEADQUARTERS) | 3152486128 | User01 | 20001 | EDIT | HISTORY |
| ☐ COMPANY A, FOR NEGOTIATION (FOR BRANCH OFFICE) | 1800457359 | User01 | 20001 | EDIT | HISTORY |

410

F I G. 5A

500

INSTALLATION DATA EDIT      User01 (TENANT ID : 10001)

INSTALLATION DATA ID : 3152486128

INSTALLATION DATA NAME : COMPANY A, FOR NEGOTIATION (FOR HEADQUARTERS)

TARGET DEVICE :

SETTINGS FILE : S001    (REFERENCE...) (EDIT...)

REGISTRATION DESTINATION TENANT : NONE    (SELECT...)

(SAVE) (CANCEL)

510

REGISTRATION DESTINATION TENANT SELECTION      User01 (TENANT ID : 10001)

- DO NOT SELECT
- 20001
- 20005

(OK) (CANCEL)

SERVICE-TO-USE SELECTION — User01 (TENANT ID : 10001)

REGISTRATION DESTINATION TENANT : 20001

USEABLE SERVICE :

- ☑ Serv A
- ☑ Serv B

[ OK ]   [ CANCEL ]

530

ADDITIONAL APPLICATION CONFIRMATION — User01 (TENANT ID : 10001)

FOLLOWING APPLICATIONS WILL BE INSTALLED IN ORDER TO USE Serv A AND Serv B.

- App S
- App T

INSTALLATION DATA EDIT — User01 (TENANT ID : 10001)

INSTALLATION DATA ID : 3152486128

INSTALLATION DATA NAME : COMPANY A, FOR NEGOTIATION (FOR HEADQUARTERS)

TARGET DEVICE :

SETTINGS FILE : S001    [REFERENCE...] [EDIT...]

---

REGISTRATION DESTINATION TENANT : 20001    [SELECT...]

SERVICE TO USE :    ServA, ServB

ADDITIONAL APPLICATION : App S, App T    [EDIT SETTING VALUE...]

[SAVE]  [CANCEL]

FIG. 10

```
┌─ 1000
│ AUTOMATIC EXECUTION OF INSTALLATION PROCESSING
│
│   TENANT ID : [ 10001                    ] ~1001
│
│   PLEASE DESIGNATE SEARCH CONDITION FOR INSTALLATION DATA : ~1002
│     ⦿ SEARCH BY INSTALLATION DATA ID :
│         [ 3152486128              ]
│
│     ○ SEARCH BY SERIAL NUMBER (ABC11111)
│
│                           ( SEARCH )  ( CANCEL )
```

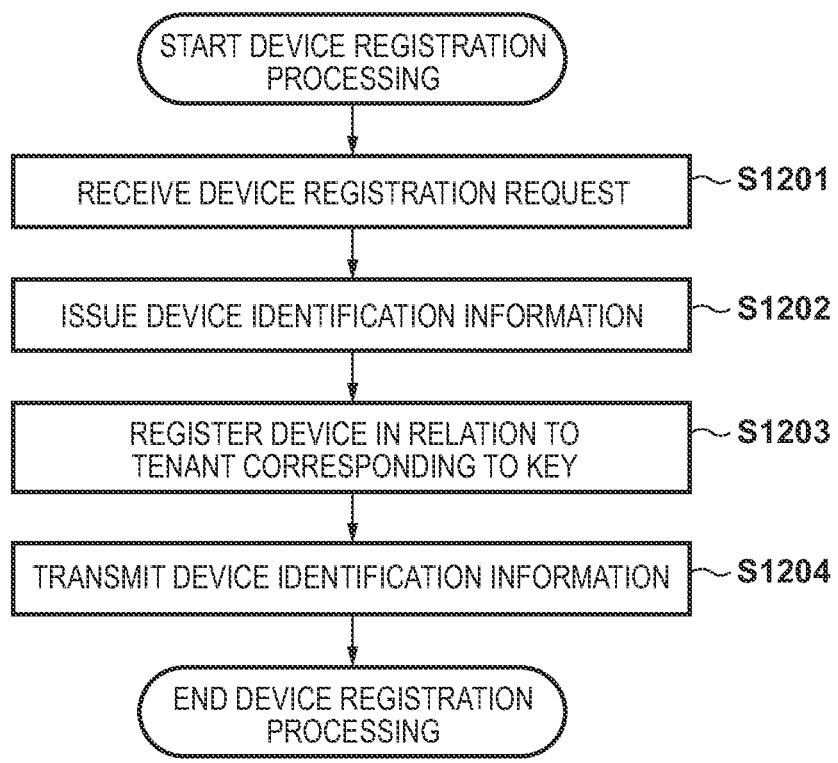

| INSTALLATION DATA EDIT | User01 (TENANT ID : 10001) |
|---|---|

INSTALLATION DATA ID : 3152486128

INSTALLATION DATA NAME : COMPANY A, FOR NEGOTIATION (FOR HEADQUARTERS)

TARGET DEVICE :

SETTINGS FILE : S001    (REFERENCE...) (EDIT...)

---

REGISTRATION DESTINATION TENANT : 20001, 20005    ~1303  (SELECT...)

1302 ~ ☑ MAKE NEW GENERATION OF TENANT SELECTABLE WHEN INSTALLING

USABLE SERVICES :    ServA, ServB, ServC  ~1301

ADDITIONAL APPLICATIONS : App S, App T, App U    (EDIT SETTING VALUE...) 501

\* FOR ADDITIONAL APPLICATIONS, ONLY THOSE NECESSARY IN ACCORDANCE WITH SERVICE TO USE DECIDED WHEN INSTALLATION WAS EXECUTED WILL BE INSTALLED (SAVE) (CANCEL)

---

| REGISTRATION DESTINATION TENANT SELECTION | User01 (TENANT ID : 10001) | ~1310 |
|---|---|---|

☑ 20001
☑ 20005

(OK) (CANCEL)

F I G. 17

AUTOMATIC EXECUTION OF INSTALLATION PROCESSING

INSTALLATION DATA WAS FOUND : 1101
    TENANT ID            : 10001
    INSTALLATION DATA ID  : 3152486128
    SERIAL NUMBER      : ABC11111

INSTALLATION PROCESSING CONTENT : 1102
    1. UPDATE FIRMWARE (FIRMWARE V1.02a)
    2. REBOOT
    3. USE SETTINGS FILE (SETTINGS FILE: S001)
    ...

PLEASE DESIGNATE REGISTRATION DESTINATION TENANT : 1701

REGISTRATION DESTINATION TENANT ID : [ 20001 ▼ ]
    20001
    20005
    GENERATE NEW ( EXECUTE )    ( CANCEL )

SERVICE-TO-USE SELECTION

REGISTRATION DESTINATION TENANT : 20001

USEABLE SERVICE :

- ☑ Serv A
- ☑ Serv B

[ OK ]  [ CANCEL ]

1810

SERVICE-TO-USE SELECTION

REGISTRATION DESTINATION TENANT : GENERATE NEW

USEABLE SERVICE :

- ☑ Serv A
- ☑ Serv B
- ☑ Serv C

[ OK ]  [ CANCEL ]

INFORMATION PROCESSING APPARATUS FOR INSTALLING APPLICATIONS RELATED TO A PREDETERMINED GROUP

BACKGROUND

Field of the Disclosure

The present disclosure relates to an information processing apparatus, an installation management server, a system, methods of controlling the same, and a storage medium.

Description of the Related Art

In conjunction with the spread of cloud services and IoT (Internet of Things), systems for managing on a device management server devices such as image processing apparatuses are becoming known. On a device management server, devices are managed for each customer organization (hereinafter referred to as customer organization). In Japanese Patent Laid-Open No. 2018-18119, a form in which image processing apparatuses and user information are managed and users use image processing apparatuses under a tenant that is the same as a tenant to which they belong is disclosed.

Also, in newly utilizing devices such as image processing apparatuses, it is necessary to perform installation processing in accordance with a usage environment of the image processing apparatuses in advance. Details of the installation processing include installing firmware, using setting value data, and the like, and it requires a lot of time and effort to execute these processes on a plurality of devices. Accordingly, as a way to efficiently perform the installation processing, a system in which installation data is generated in advance and by using that in accordance with a script, the installation processing is efficiently executed, can be conceived.

However, this conventional technique has the following issue. Applications to install on the devices and setting values for those applications vary depending on what kind of service usage contracts have been made by customer organizations to which those devices are to be registered. For example, in a case where a customer organization is to use a service for backing up user data on a cloud, it becomes necessary to install an application for generating on a device backup data and transmitting the backup data to a cloud, as well as to set a backup transmission schedule. Also, so long as a device is managed by the same customer organization, it becomes necessary to install the same application and the setting values thereof.

Accordingly, installation workers need to select and set applications to install on devices and the setting values thereof as an installation operation. Furthermore, if a plurality of devices are associated in a corresponding customer organization, such an installation operation must be performed on each of the devices which would be extremely inefficient.

SUMMARY

The present disclosure enables realization of a system for reducing workload of installation workers by determining, automatically installing applications and the like that are necessary, and performing suitable settings, on a device to be installed based on a service usage status of a customer organization.

One aspect of the present disclosure provides an information processing apparatus comprising: at least one memory device that stores a set of instructions; and at least one processor that executes the set of instructions to: accept identification information that identifies a predetermined group of a customer organization; acquire, from an installation management server that manages installation data to use in installation processing of an information processing apparatus, installation data related to the accepted identification information; execute the installation processing of the information processing apparatus in accordance with the acquired installation data; and in a case where a registration key for a device management server that manages an information processing apparatus within a network is included in the acquired installation data, when the installation processing is ended, request registration of the information processing apparatus to the device management server using the registration key, wherein the installation data includes a script that performs installation of an application for providing a service related to the identification information and setting of the application.

Further features of the present disclosure will become apparent from the following description of exemplary embodiments (with reference to the attached drawings).

BRIEF DESCRIPTION OF THE DRAWINGS

FIG. 4 is a view illustrating examples of screens to be displayed on a client terminal according to one or more aspects of the present disclosure.

FIG. 5A to FIG. 5C are views illustrating examples of screens to be displayed on a client terminal according to one or more aspects of the present disclosure.

FIG. 10 is a view illustrating an example of an operation screen for when the device searches for the script according to one or more aspects of the present disclosure.

FIG. 12 is a flowchart illustrating device registration processing of the device management server according to one or more aspects of the present disclosure.

FIG. 13 is a view illustrating examples of screens to be displayed on a client terminal according to one or more aspects of the present disclosure.

FIG. 17 is a view illustrating an example of an operation screen for displaying content of the automatic installation processing on the device according to one or more aspects of the present disclosure.

FIG. 18 is a view illustrating service selection screens for registering the device to an existing tenant or a new tenant according to one or more aspects of the present disclosure.

DESCRIPTION OF THE EMBODIMENTS

Figure 1:
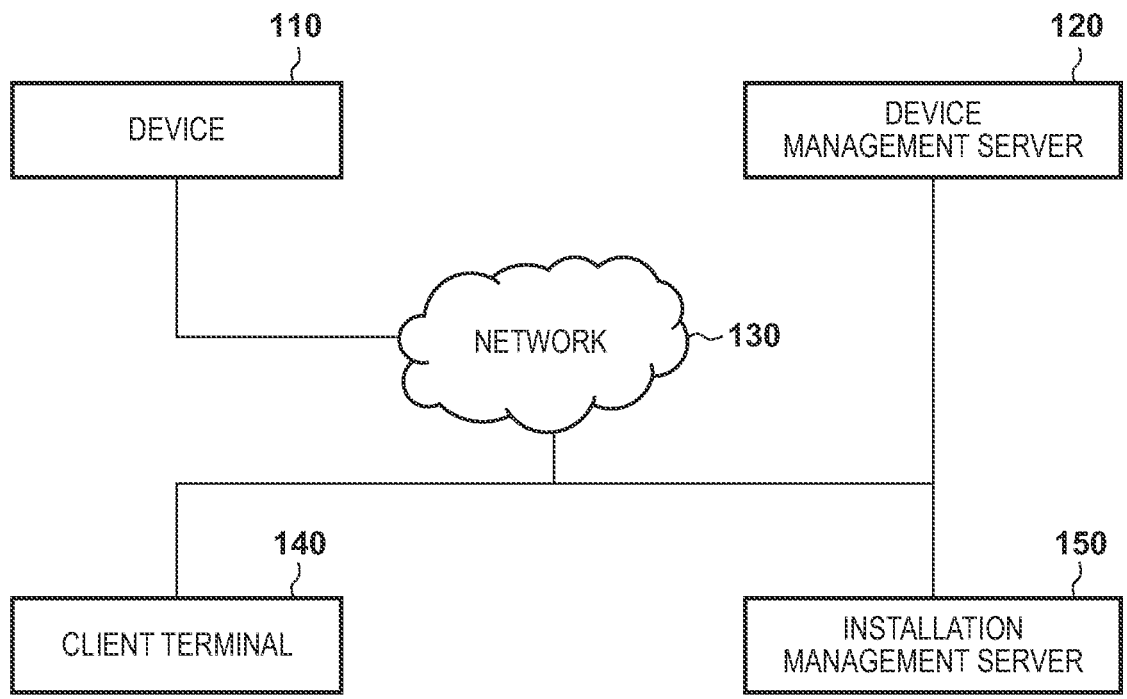
FIG. 1 is a schematic diagram illustrating an overall configuration of a device management system according to one or more aspects of the present disclosure.

Hereinafter, embodiments will be described in detail with reference to the attached drawings. Note, the following embodiments are not intended to limit the scope of the claimed disclosure. While a plurality of features are described in the embodiments, not all of these features are necessarily essential to the present disclosure, and a plurality of features can also be combined as appropriate. Furthermore, the same reference numerals are given to constituent elements that are the same or similar in the attached drawings, and overlapping description thereof will be omitted.

First Embodiment

<System Configuration>

An embodiment of the present disclosure will be described hereinafter. First, a configuration of a device management system according to the present embodiment will be described with reference to FIG. 1.

As illustrated in FIG. 1, the device management system (information processing system) of the present embodiment includes a device 110, a device management server 120, a client terminal 140, and an installation management server 150. Each apparatus is connected so as to be able to communicate with each other via a network 130.

The device 110 is connected with the device management server 120 and the installation management server 150 via the network 130 such as the Internet, for example. The device 110 is an information processing apparatus to be installed and used within a network of a customer organization, and an image processing apparatus such as a printer, a copy machine, and a scanner can be given, for example. A customer organization refers to an organization such as a company who actually uses the device 110, and information related to a device are managed for each customer organization (group) on the device management server 120. Note that although only one device 110 is taught in FIG. 1, configuration may be taken so that there is a plurality of devices 110 within a network of one customer organization. Also, configuration may be taken so that the devices 110 of a plurality of customer organizations are connected to one device management server 120.

On the device 110, an automatic installation application (not shown) and a server connection application (not shown) are installed. The device 110 acquires information necessary for installation from the installation management server 150 using the automatic installation application and applies that to the device 110 itself. Then, the device 110 transmits setting information, operation information, and the like to the device management server 120 using the server connection application.

When the device 110 is connected to the device management server 120, access permission information such as an access token and a session ID is issued in relation to the device 110 by authentication processing of the device management server 120. Then, the device 110 transmits the setting information, the operation information, and the like to the device management server 120 using such access permission information.

The device management server 120 manages for each customer organization to which the device 110 belongs, the setting information, the operation information, and the like acquired from the device 110. On the device management server 120, processing for registering the device 110 is performed in advance. When the device 110 is connected to the device management server 120, the device 110 is authenticated using information (registration information) registered by the registration processing, and access permission information is issued in relation to the device 110.

The client terminal 140 is a communication terminal operated directly by a sales organization operator and is an information processing apparatus such as a PC or a smartphone. A Web browser is installed on the client terminal 140. The Web browser acquires screen information from a Web client on the respective server apparatuses and displays a screen on a browser. The examples of screens to be displayed on the browser of the client terminal 140 will be described later. Here, a sales organization is an organization that sells and installs the device 110 to the customer organization and performs management services. In other words, as an organizational structure, the structure is one in which there is a plurality of customer organizations in the layers below the sales organization.

<Hardware Arrangement>

Next, a hardware configuration of a server computer for realizing the device management server 120 and the installation management server 150 according to the present embodiment will be described with reference to FIG. 2.

Figure 2:
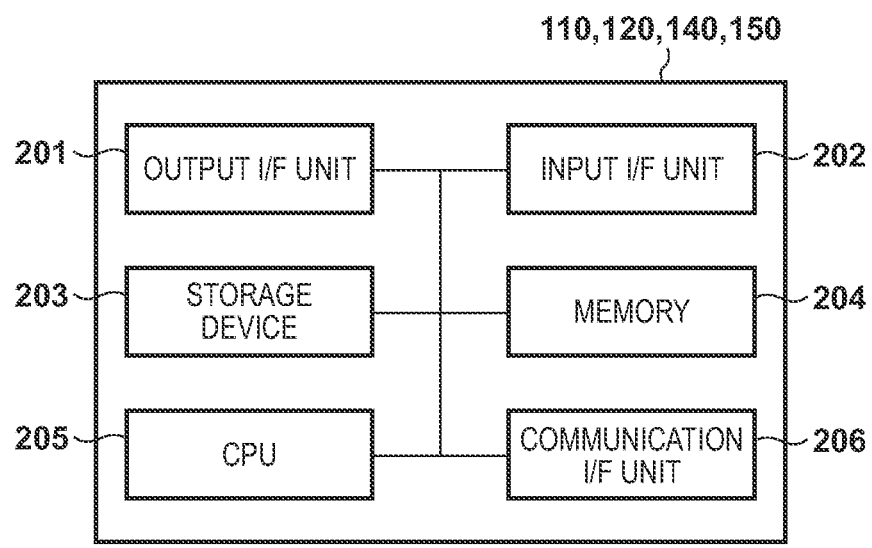
FIG. 2 is a block diagram illustrating a hardware configuration of each apparatus of the device management system according to one or more aspects of the present disclosure.

As illustrated in FIG. 2, each of server computers 120 and 150 comprise an output I/F unit (display unit) 201, an input I/F unit 202, a storage device 203, a memory 204, a CPU 205, and a communication I/F unit 206. The output I/F unit 201 is connected with an output apparatus such as a display. The input I/F unit 202 is connected with an input apparatus such as a keyboard.

Each storage device 203 stores an OS (Operating System), and in the device management server 120, also stores an authentication program, a management program, registration information of the device 110, setting information and operation information received from the device 110, and the like. Also, the storage device 203 of the installation management server 150 stores installation data and the like. Here, an authentication program is a program for performing authentication processing and connection processing. Also, a management program is a program for managing the registered device 110.

The CPU 205 loads an authentication program and a management program from the storage device 203 to the memory 204 and executes control programs such as the authentication program and the management program. The communication I/F unit 206 is a network interface for controlling the communication of the device 110 via the network 130.

Note that the diagram indicating the hardware configuration illustrated in FIG. 2 is something that corresponds to a hardware block diagram of a typical information processing apparatus and is applied to the device 110 and the client terminal 140 of the present embodiment. Accordingly, the hardware configurations of the device 110 and the client terminal 140 are the same, and therefore, description will be omitted. Of course, configuration may be taken so that each apparatus includes components besides the above-described blocks, and this is merely an exemplification of a minimum necessary configuration in describing the present disclosure.

<Software Configuration>

Figure 3:
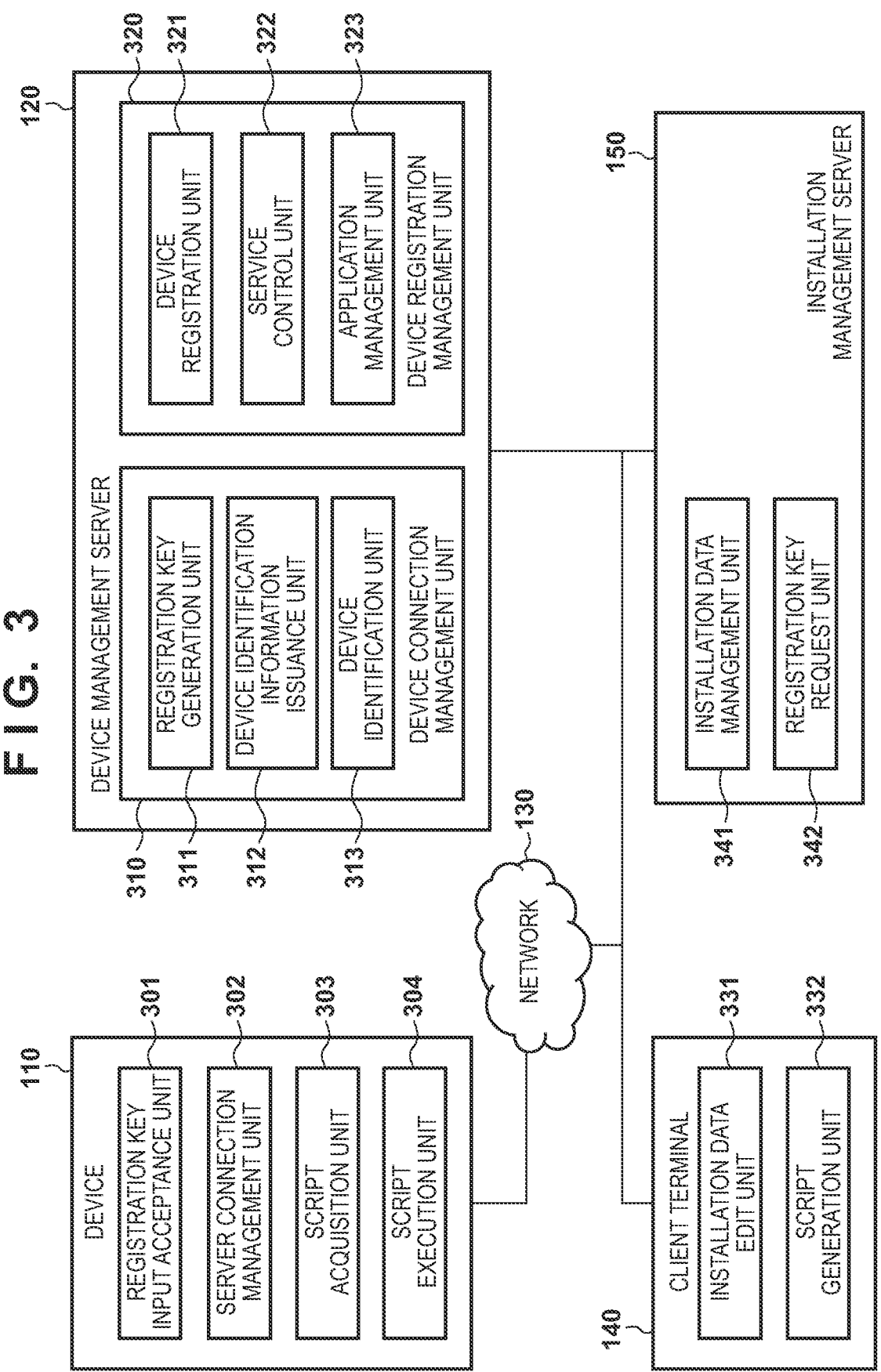
FIG. 3 is the block diagram illustrating a software configuration of each apparatus of the device management system according to one or more aspects of the present disclosure.

Next, the main configuration units (software configurations) of the device 110, the device management server 120, the client terminal 140, and the installation management server 151) according to the present embodiment will be described with reference to FIG. 3. Although description is given here as a software configuration, configuration may be taken so as to realize as a hardware configuration having the functions to be described below or as a configuration of a combination including software and hardware having the functions to be described below.

The data of the device 110 is managed in a state in which it is separated logically for each customer organization and sales organization in the device management server 120. Accordingly, in the device management server 120, a "tenant (group)", which is a virtual organization, is generated for each customer organization and sales organization and is assigned to each customer organization and sales organization. Then, by registering the device 110 in advance to tenants assigned to customer organizations and sales organizations, the data of the device 110 can be managed separately for each tenant. The data of the device 110, if for example the device 110 is a multi-function device, indicates user authentication information, an address book, a usage status of various functions of the multi-function device, a usage status of consumables such as toner and paper, and the like. Note that in the following description, a tenant that is a sales organization will be referred to as a sales tenant and the tenant that is a customer organization will be referred to as a customer tenant.

The device 110 includes a registration key input acceptance unit 301, a server connection management unit 302, a script acquisition unit 303, and a script execution unit 304. The registration key input acceptance unit 301 accepts inputting of a registration key for specifying a customer tenant to which the device 110 belongs. According to the present embodiment, it is assumed that the registration key is to be automatically inputted by the script execution unit 304.

The server connection management unit 302 performs processing for registering the device 110 to the device management server 120 using the registration key. By the device 110 being registered to the device management server 120, the corresponding device 110 is able to acquire device identification information. Then, the device 110, by using the device identification information, will be able to use services provided by the device management server 120.

The script acquisition unit 303 acquires a script that corresponds to installation data and information for specifying a registration destination tenant (i.e., a customer tenant to which the device 110 belongs) that is associated with the installation data from the installation management server 150. Here a script is a group of commands for executing the installation processing of the device 110 and is generated by a script generation unit 332 to be described later. The script execution unit 304, in addition to executing the script acquired by the script acquisition unit 303, performing changing of settings of the device 110, downloading of files, and the like, inputs the registration key acquired by the same in relation to the registration key input acceptance unit 301.

The device management server 120 includes a device connection management unit 310 constructed by execution of the authentication program and a device registration management unit 320 constructed by execution of the management program. The authentication program and the management program are stored in the storage device 203 (FIG. 2). The device connection management unit 310 includes a registration key generation unit 311, a device identification information issuance unit 312, and a device identification unit 313. Also, the device connection management unit 310, in addition to managing identification information for identifying the device 110, executes the authentication processing to be described later.

The registration key generation unit 311 generates a registration key for uniquely specifying a customer tenant. Generally, at least one registration key is generated in relation to one customer tenant. A registration key is used for registering to the device management server 120 a customer tenant to which the device 110 belongs. The generated registration key is recorded in a registration key management table. An example of the registration key management table is indicated in Table 1.

TABLE 1

| Tenant ID | Registration Key | Expiration Date |
|---|---|---|
| 20001 | 12345678 | 2019/4/1 0:00 |
| 20001 | 23456789 | 2019/7/1 0:00 |
| 20002 | 34567890 | 2019/5/1 0:00 |

The "tenant ID" in Table 1 is the identification information of customer tenants. The "registration key" is registration keys generated so as not to repeat on the device management server 120 and is information for uniquely identifying the customer tenants. A registration key is generated on the device management server 120 in accordance with a request from a registration key request unit 342 on the installation management server 150 to be described later. Although the "expiration date" is expiration dates of the registration keys, it is not necessary to set expiration dates. For example, the expiration date is undesignated information for a registration key with no expiration date. The registration keys are unique on the device management server 120 and therefore, by using a registration key, a customer tenant to which the device 110 belongs can be specified.

The device identification information issuance unit 312 issues a device ID (device identification information) for uniquely identifying the device 110 for each customer tenant. In the present embodiment, an example in which a device ID is used as authentication information required for the device 110 to access the device management server 120 is described. Note that a form may be taken so that the device identification information issuance unit 312 issues a device ID and an authentication key as authentication information and accesses the device management server 120 using the device ID and the authentication key.

Generally, the device 110 has a serial number for identifying the device. However, the serial number assigned to the device is not necessarily unique between different products and different manufacturers. Also, due to reasons such as the same device being transferred to another customer organization, there is a possibility that one device is registered multiple times to different customer tenants. Therefore, in the present embodiment, configuration is taken so that when a registration request is received from the device 110, by issuing a device ID in relation to that device 110, the device 110 is uniquely identified within the device management server 120. The issued device ID is recorded to a device identification information management table (Table 2) to be described later. The device identification unit 313, when receiving data from the device 110, receives the device ID from the device 110 and specifies the device 110 from which the data was transmitted. Table 2 is an example of a device identification information management table to be generated by the device identification information issuance unit 312.

TABLE 2

| Device ID | Tenant ID | Ser. No. |
|---|---|---|
| 11111111-1111-1111-1111-111111111111 | 20001 | DEV00001 |
| 22222222-2222-2222-2222-222222222222 | 20001 | DEV00002 |
| 33333333-3333-3333-3333-333333333333 | 20002 | DEV00002 |

The "device ID" is ID information for uniquely identifying the device 110 on the device management server 120. The "tenant ID" is ID information for specifying a customer tenant to which the device 110 belongs. This tenant ID is specified by a registration key that is included in a registration request received from the device 110. The "serial number" is ID information for uniquely identifying a device within a customer tenant. In other words, as described above, the serial number is different from the device ID and is not necessarily unique within the entire device management server 120. Meanwhile, because the tenant ID is unique within the entire device management server 120, so long as at least the tenant ID is used, a device can be uniquely specified within the device management server 120.

The device registration management unit 320 includes a device registration unit 321, and the device registration management unit 320 registers the device 110 to a customer tenant (group) and manages the device 110 by customer tenant. Also, the device registration management unit 320 includes a service control unit 322 and an application management unit 323; and the device registration management unit 320 manages, for each customer tenant, services to provide to the devices and manages, for each service, applications that need to be installed on the devices to use the services. The device registration unit 321 receives the device identification information (refer to Table 2) issued by the device identification information issuance unit 312. Then, the device registration unit 321 associates the information of the device 110 with the customer tenant and stores the result on the device management server 120. Table 3 is an example of a device information table that the device registration unit 321 registers.

TABLE 3

| Tenant ID | Ser. No. | Device Name | Registration Date and Time |
|---|---|---|---|
| 20001 | DEV00001 | Device A | 2018/12/1 10:00 |
| 20001 | DEV00002 | Device B | 2018/12/8 10:00 |
| 20002 | DEV00002 | Device C | 2018/12/15 10:00 |

The "tenant ID", as described above, is ID information for specifying a customer tenant to which the device 110 belongs. A plurality of devices 110 can be registered in association with one tenant ID. The "serial number" is ID information for uniquely identifying the device 110 within a customer tenant. In addition, information such as a device name and registration date and time of registering the device 110 is recorded as information of the device on Table 3 on the device information table. The service control unit 322 controls and manages by tenant, services that can be used by the devices. Table 4 is an example of a service control table managed by the service control unit 322.

TABLE 4

| Tenant ID | Type | Parent Tenant | Service ID |
|---|---|---|---|
| 10000 | Sales | | ServA, ServB, ServC, ServD |
| 10001 | Sales | 10000 | ServA, ServB, ServC |
| 20001 | Customer | 10001 | ServA, ServB |
| 20005 | Customer | 10001 | ServA, ServC |
| 10002 | Sales | 10000 | ServA, ServD |
| 20002 | Customer | 10002 | ServD |

The "tenant ID" is ID information for specifying a sales tenant or a customer tenant. The "type" is information that indicates whether a tenant is a sales tenant or a customer tenant. The "parent tenant" is a tenant ID of a sales tenant who is positioned at a higher hierarchical layer of tenants. A sales tenant or a customer tenant can be generated under a sales tenant, but a new tenant cannot be generated under a customer tenant. Note that in the example of Table 4, since the parent tenant of the sales tenant whose tenant ID is "10000" is blank, it is understood that the sales tenant whose tenant ID is "10000" is the uppermost root tenant in the organizational structure of tenants. The "service ID" is a list of service IDs of services that can be used by a tenant. A service is for example a service for backing up device data on a cloud, a service for aggregating the usage status of a device, or the like. The upper tenants in relation to lower tenants can selectively provide services for which to permit use by the lower tenants from among services that can be used by the upper tenants. The services that can be used by each tenant are decided in advance by a contract and the like.

The application management unit 323 manages applications that need to be installed on devices for each service (function). Table 5 is an example of an application table managed by the application management unit 323.

TABLE 5

| Service ID | Application ID |
|---|---|
| ServA | App S |
| ServB | App S, App T |
| ServC | App S, App U |
| ServD | App V |

The "service ID" is ID information for specifying a service. The "application ID" is a list of IDs for specifying applications that need to be installed on a device in order to use a service. In an example of Table 5, it is indicated that two applications, App S and App T, need to be installed in order to use the service, ServB.

The client terminal 140 includes an installation data edit unit 331 and the script generation unit 332. The installation data edit unit 331 acquires installation data from the installation management server 150 and performs updating and saving of installation data on the installation management server 150 in accordance with an instruction from the user. The script generation unit 332, when the installation data edit unit 331 stores the installation data on the installation management server 150, generates a script that can be executed by the device 110 based on the content of the installation data, associates the result with the installation data, and stores the result on the installation management server 150. Installation data indicates a structured data format for managing on the installation management server 150 and editing in the installation data edit unit 331. A script is a group of commands for executing the installation processing of the device 110 and a pair of one piece of installation data and one script is stored on the installation management server 150. However, for the sake of descriptive convenience, it is assumed that "installation data" is described to include the above installation data and script. Note that configuration may be taken so as to construct the installation data edit unit 331 and the script generation unit 332 on the installation management server 150. In such a case, the client terminal 140, by accessing the installation management server 150 using a Web browser and the like, edits the installation data.

The installation management server 150 includes an installation data management unit 341 and the registration key request unit 342. The installation data management unit 341 manages installation data transmitted from the client terminal 140 and the scripts associated therewith. Table 6 is an example of an installation data table managed by the installation data management unit 341.

such as a case where the content of the installation processing remains within updating firmware and adding applications of the device 110, there is no need to register the "settings file" in the installation data.

The "target device" is a serial number of a device on which the installation data is to be executed. In a case where a target device is set, the installation data thereof cannot be used in relation to another device. Note that configuration may be taken so that a plurality of serial numbers is set as a value in the "target device". Meanwhile, in a case where a serial number of a specific device is not defined in the "target device", it means that the installation data can be used generally in relation to a plurality of devices. The "registration destination tenant ID" is a tenant ID of a customer tenant to which the device 110 to which the corresponding installation data was applied is registered. It is assumed that the registration destination tenant ID is something that is designated when editing the installation data and is not to be changed. In a case where the registration destination tenant ID is blank in Table 6, it means that device registration processing has not been performed for the corresponding device.

Table 7 is an example of a script managed by the installation data management unit 341. Table 7 is an example of a script which has been associated with the installation data whose installation data ID is "3152486128" in Table 6.

TABLE 6

| Installation Data ID | Tenant ID | Installation Data Name | Settings File | Target Device | Registration Destination Tenant ID |
| --- | --- | --- | --- | --- | --- |
| 3152486128 | 10001 | Company A, for negotiation (for headquarters) | S001 | | 20001 |
| 1800457359 | 10001 | Company A, for negotiation (for branch office) | S001 | ABC11111 | 20001 |
| 5807515798 | 10002 | Company B, for negotiation | S003 | | 20002 |

The "installation data ID" is an identifier for uniquely specifying the installation data. Because it is information that is used when the device 110 specifies the installation data, it is desirable to be configured by random numbers that are easy for the user to input via the input I/F unit 202 of the device 110 but is hard to predict. The installation data ID is automatically issued by the installation management server 150. The "tenant ID" is ID information for specifying a tenant that holds the installation data thereof. The "installation data name" is a desired text string that makes it easier for the user to identify the installation data thereof. The "settings file" is an identifier of a file in which various setting values to be used for the device 110 is written. Setting values for various setting items of the device 110 are included in a settings file. If a "settings file" (identifier) is registered to installation data, a file that needs to be set on the device 110 is specified by the "settings file" when installation is executed and various setting values of the device 110 is changed (reflected) based on the file thereof. In a case where there is no need to change the setting values

TABLE 7

| Processing No. | Processing | Content Type | Content ID |
| --- | --- | --- | --- |
| 001 | Download Firmware | Firmware | V1.02a |
| 002 | Update Firmware | Firmware | V1.02a |
| 003 | Reboot | — | — |
| 004 | Download Settings File | Settings | S001 |
| 005 | Update Settings | Settings | S001 |
| ... | ... | ... | ... |

The "processing No." is a number that indicates the order of automatic installation processing to be executed by the script execution unit 304 of the device 110. The "processing" indicates content of installation processing. Note that it is assumed that network setting processing (not shown) of the device 110 is also included in Table 7. The device 110, after having been executed the installation processing including the network setting processing, enters a state in which services on an external server such as the device management server 120 can be used. The "content type"

indicates a type of content to use in the installation processing. Content is firmware, applications, a settings file, and the like that is necessary in the installation processing. The content is held by the installation management server 150, a content management server (not shown), and the like in a state in which it is accessible from the device 110. The "content ID" is ID information for specifying content on the installation management server 150, the content management server (not shown), and the like which manage content.

In the example of Table 7, it is understood that the order of processing is something that follows the processing No., in other words in the order of download firmware, update firmware, reboot, download settings file, and update setting.

The registration key request unit 342 of the installation management server 150, in a case of receiving a request to acquire installation data from the device 110, requests the device management server 120 to issue a registration key to a registration destination tenant ID (Table 6) which is associated with the corresponding installation data. The device registration management unit 320 stores information related to each device 110 in a state in which the information is separated for each tenant ID of tenant to which the device is registered. Therefore, a user of a customer organization can reference only the information of the device 110 which belongs to the customer tenant with which the user him/herself is associated. Meanwhile, the client terminal 140 of a sales organization can reference information of the device 110 of a customer organization tenant which is managed by the sales organization thereof and of a tenant corresponding to a sales organization under the umbrella of the sales organization thereof. By this, the sales organization can provide the management service of the device 110 in relation to the customer organization.

<Example of Screens on Client Terminal>

Next, examples of screens for when managing (such as editing, deleting, and viewing) the installation data on the client terminal 140 will be described with reference to FIG. 4 and FIG. 5A to FIG. 5C. Although the screens to be described below are examples of screens to be displayed on the output I/F unit 201 of the client terminal 140, as one form, configuration may be taken so as to be achieved by the client terminal 140 having a Web browser function and the installation management server 150 having a Web server function. More specifically, these screens are achieved by receiving screen information (e.g., HTML format) from the installation management server 150 by the client terminal 140 and displaying on a browser of the client terminal 140 based on the received screen information.

A reference numeral 400 in FIG. 4 is a login screen to be displayed in the beginning when the client terminal 140 accesses the installation management server 150. When a user name and password inputted via the login screen 400 is authenticated, a list screen 410 to be described later is displayed. If configuration is taken so as so include a tenant ID as part of the user ID so that the tenant is uniquely specified only by the user ID, it is not necessary to input a tenant ID when authenticating a user on the login screen.

A reference numeral 410 in FIG. 4 is a screen of a list of installation data. Only the installation data that the logged-in user can reference is displayed on the list screen 410. For example, a tenant ID that was inputted on the authentication screen in the reference numeral 400 is "10001". Since installation data IDs that are associated with the tenant ID "10001" are "3152486128" and "1800457359" among the installation data exemplified in Table 6, only those two pieces of installation data are displayed on the list screen. The installation data name, the installation data ID, the update user, and the registration destination tenant ID, for example, are displayed for each piece of installation data on the list screen. The update user indicates the ID information of an operator who last edited the corresponding installation data. Operations such as newly generating, editing, and deleting the displayed installation data are possible on the list screen. Also, it is possible to confirm the history related to each piece of installation data. Various information can be handled as history information and it is possible to confirm information such as a device on which the corresponding installation data was used, for example.

A reference numeral 500 in FIG. 5A is an example of an edit screen to be displayed when an edit button of the installation data (installation data ID=3152486128) displayed on the list screen 410 is selected. Because an installation data ID is an ID to be automatically decided by the installation management server 150, configuration is taken so as not to be able to change on the edit screen 500. Information other than the installation data ID such as the installation data name, the serial number of a device on which to apply the installation data, and the settings file can be edited. Also, it is possible to designate the registration destination tenant of a device in a case where the corresponding installation data is used. The example of FIG. 5A indicates a state in which the registration destination tenant is not designated and can be selected by operating the corresponding selection button and transitioning to a registration destination tenant selection screen 510.

The reference numeral 510 in FIG. 5A is a registration destination tenant selection screen to be displayed when the selection button of the registration destination tenant is selected in the reference numeral 500. In the example in the reference numeral 510, only the tenant IDs of the customer organizations that belong to the sales organization (tenant ID=10001) is displayed as selection items. In other words, the tenant IDs of the customer organizations that belong to the sales organizations other than the logged-in tenant ID=10001 will not be displayed. In the example illustrated in FIG. 5A, "DO NOT SELECT", "20001", and "20005" are listed as selection items. The operator can select the desired registration destination tenant by selecting any of the selection items and operating an OK button.

A reference numeral 520 in FIG. 5B is a service selection screen to be displayed after selecting the registration destination tenant on the registration destination tenant selection screen 510. In the example of the service selection screen 520, as indicated in the example in Table 4, ServA and ServB which can be used by the tenant ID=20001 which was selected as the registration destination are selectable. The operator designates to select/not select the services displayed on the service selection screen 520 by selecting/not selecting the checkboxes and can confirm the selection by operating the OK button thereafter.

A reference numeral 530 in FIG. 5B is an additional application confirmation screen to be displayed after selecting a service to use on the service selection screen 520. In the example of the confirmation screen 530, as indicated in the example of Table 5, AppS and AppT are displayed as applications that need to be installed in order to use ServA and ServB selected as the services to use. Here, by storing the installation data, a script to which processing for installing AppS and AppT was added can be generated by the script generation unit 332.

Note that when only one service is selected on the service selection screen 520, only the application related to the selected one service will be displayed on the confirmation screen 530. For example, when only "ServA" is selected on the service selection screen 520, only "AppS" is displayed on the confirmation screen 530. The operator, by operating the OK button, can start installing the corresponding application.

A reference numeral 540 in FIG. 5C is an installation data edit screen after confirming additional application on the confirmation screen 530. The difference from the edit screen 500 is that by designating the registration destination tenant and the services to use, the services to use and the applications to add are displayed. Settings for each application is possible by pressing a setting value edit button 501 in relation to the applications to add. Details of this will be described below.

Display control for the screens illustrated in FIG. 4 and FIG. 5A to FIG. 5C is performed on a client application Which operates on the client terminal 140. However, there is no intention to limit the present disclosure, and configuration may be taken for example as a Web application provided by the installation management server 150 so as to display by connecting with the installation management server 150 by a Web browser from the client terminal 140.

<Tenant Selection Processing by Installation Management Server>

Figure 6:
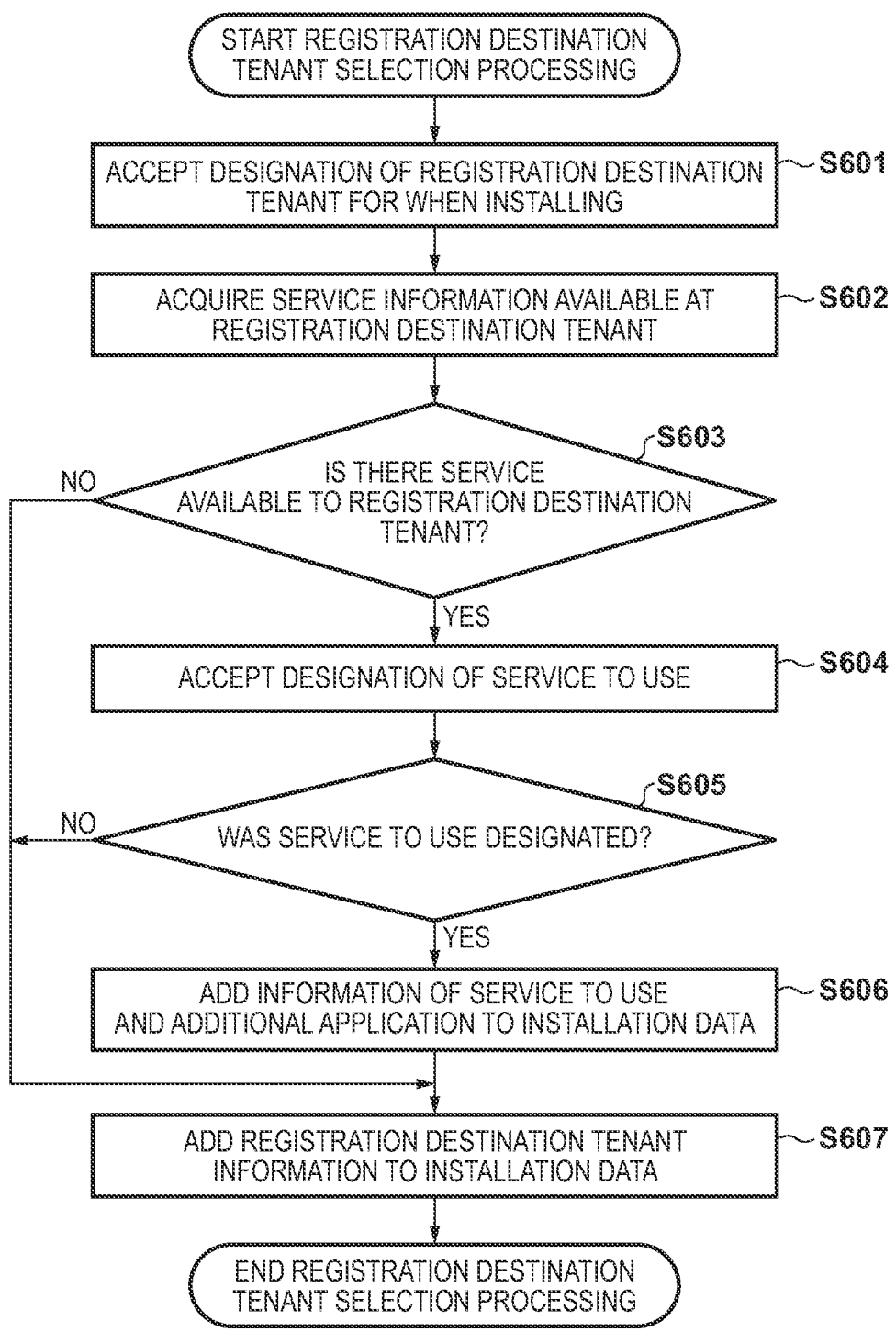
FIG. 6 is a flowchart illustrating processing for selecting a registration destination tenant of an installation management server according to one or more aspects of the present disclosure.

Next, a processing procedure of registration destination tenant selection processing to be executed by the installation management server 150 in the present embodiment will be described with reference to FIG. 6. Here, processing in which the user (installation worker) accesses the installation management server 150 from the client terminal 140, selects the registration destination tenant, and edits (generates) the installation data will be described. Note that installation data that is related to each customer organization tenant (group) is stored in the storage device 203 of the installation management server 150. The edited (generated) installation data described below is stored in the above storage device 203. The present flowchart is executed by the CPU 205 of the installation management server 150 reading the program stored in the storage device 203. The numbers following S indicated below indicate the number of a step of processing included in a flowchart.

In step S601, the installation data management unit 341 receives via the network 130 a registration destination tenant ID of whose input was accepted in the installation data edit unit 331 of the client terminal 140. In the example of the selection screen 510 illustrated in FIG. 5A, registration destination tenant ID=20001 is selected and the installation data management unit 341 receives from the client terminal 140 information that indicates the selected "registration destination tenant ID=20001".

Next, in step S602, the installation data management unit 341 acquires from the service control unit 322 of the device management server 120 service information that is available to the tenant of the tenant ID received in step S601. Here, the service control unit 322 acquires from the application management unit 323 application information that needs to be installed on the device 110 for each service available by the tenant ID, includes the result in the service information, and transfers the service information to the installation management server 150. Note that although description is given for a form in which the above information to be acquired is managed on the device management server 120, a form may be taken so that the functions of the device management server 120 are combined with the installation management server 150 in one server. In such a case, the installation management server 150 will acquire corresponding information from the information (storage unit) that is managed by itself. Next, in step S603, the installation data management unit 341 determines whether the service information could be acquired in step S602. In a case where at least one piece of service information could be acquired, the processing advances to step S604 and in a case where not even one piece of service information could be acquired, the processing advances to step S607.

In step S604, the installation data management unit 341 returns to the installation data edit unit 331 a list of service information acquired in step S602 and accepts via the installation data edit unit 331 the designation of a service to use. At this time, the service selection screen 520 illustrated in FIG. 5B is displayed on the client terminal 140. Then, in step S605, the installation data management unit 341 determines based on information from the installation data edit unit 331 whether a service to use was designated via the service selection screen 520 displayed on the client terminal 140. In a case where at least one service to use was designated, the processing advances to step S606 and in a case where not even one service was designated, the processing advances to step S607.

In step S606, the installation data management unit 341 adds to the installation data the service to use accepted in step S604 and an instruction to install an application that is necessary in order to use the corresponding service and advances to step S607. In step S607, the installation data management unit 341 adds to the installation data the registration destination tenant information accepted in step S601 and ends the processing.

<Edit Screen (Client Terminal)>

Figure 7:
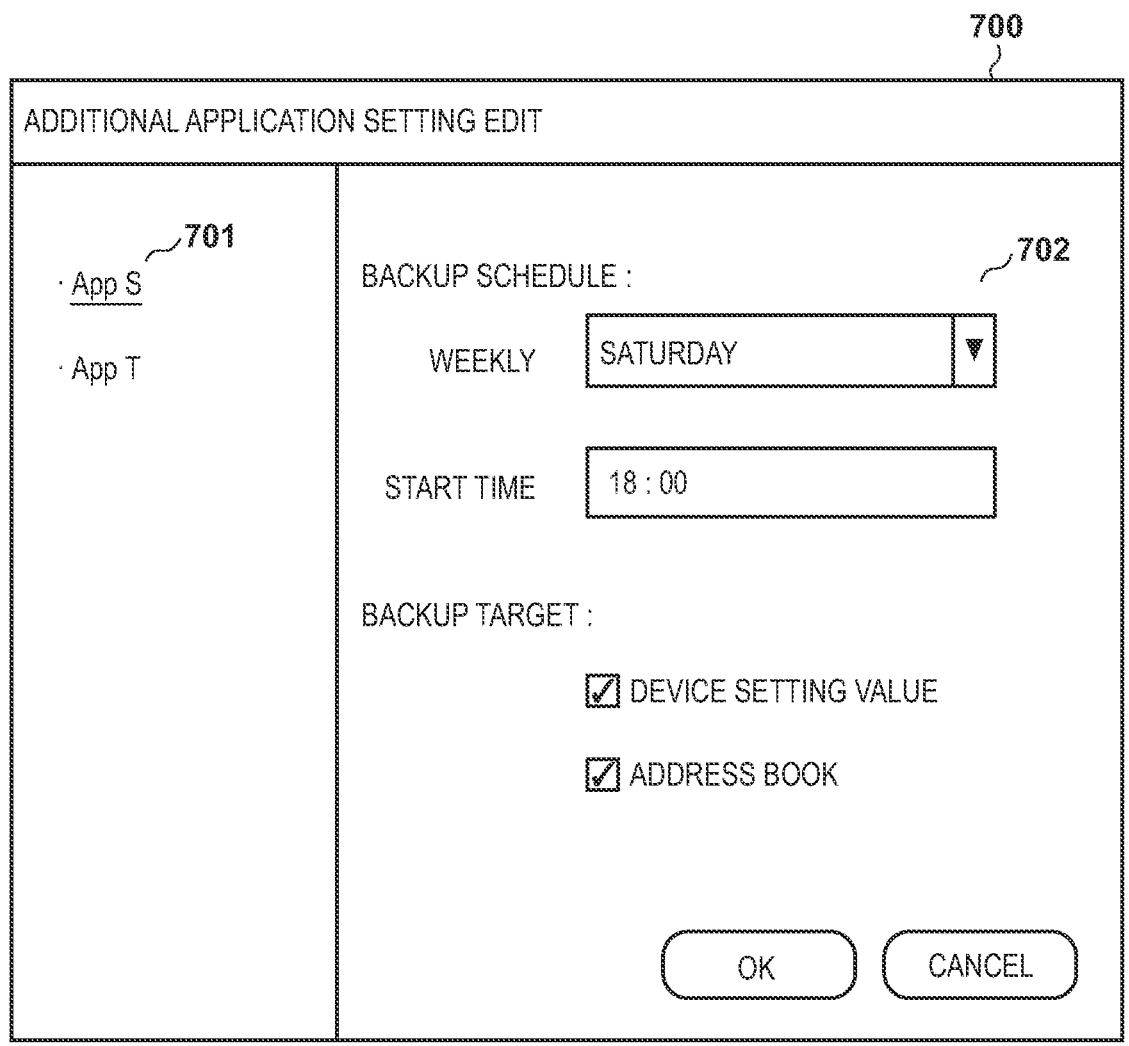
FIG. 7 is a view illustrating an example of a screen for editing additional application settings according to one or more aspects of the present disclosure.

Here, an example of an additional application setting edit screen for when the setting value edit button 501 is pressed on the edit screen 540 of FIG. 5C will be described with reference to FIG. 7. A setting edit screen 700 is configured including at least display regions 701 and 702. A list of applications to install using the installation data is displayed in the display region 701. Setting items that can be edited in the application selected in the display region 701 is displayed in the display region 702. In the example in FIG. 7, setting items such as a backup schedule of device data and a backup target can be edited as application operation settings. By editing the setting values for each application and storing the result as installation data, settings for each application are applied to the device 110 when executing the installation processing.

<Automatic Installation Processing by Device>

Next, a processing procedure of automatic installation processing to be executed on the device 110 according to the present embodiment will be described with reference to FIG. 8. The present flowchart is executed by the CPU 205 of the device 110 reading the program stored in the storage device 203. The numbers following S indicated below indicate the number of a step of processing included in a flowchart.

In step S801, the script acquisition unit 303 accepts via a designation screen 1000 in FIG. 10 to be described later displayed via the output I/F unit 201 and via the input I/F unit 202 a search condition (search information) of a script to be executed. Here, description is given for a case where an installation data ID is inputted as a search condition (search information) of a script. In such a case, the script acquisition unit 303 acquires information for specifying the installation data, in other words the installation data ID, via the input I/F unit 202 of the device 110. Configuration may be taken so that the corresponding installation data ID is inputted by a user operation on the device 110, for example. At that time, configuration may be taken so as to select in accordance with a user input from a list of candidates or so as to directly input the ID. Note that although described later, a search condition is not limited to an installation data ID and configuration may be taken so as to use other identification information such as a device serial number.

Next, in step S802, the script acquisition unit 303 uses the installation data ID inputted in step S801 and acquires a script and a registration key (installation data) from the installation management server 150. Here, in a case where registration destination tenant information is not included in the installation data corresponding to the installation data ID in the information managed by the installation management server 150, a registration key is not acquired and only a script will be acquired. For example, in a case where the installation data ID "3152486128" is inputted, since the registration destination tenant ID "20001" is registered in the example in the above Table 6, a registration key corresponding to the corresponding registration destination tenant ID is acquired in step S802.

Next, in step S803, the script execution unit 304 executes automatic installation processing in accordance with the script acquired in step S802. The order of installation processing to be executed in a case where for example the installation data ID is "3152486128" is the order of processing number (processing No.) as indicated in Table 7. Next, in step S804, the script execution unit 304 determines whether the registration key could be acquired in step S802. In a case where the registration key was acquired, the processing proceeds to step S805 and in a case where the registration key was not acquired, the automatic installation processing is ended.

In step S805, the script execution unit 304 executes processing for registering a device on the device management server 120 based on the registration key (the registration key acquired in step S802) inputted in the registration key input acceptance unit 301 of the device 110. As described above, by the automatic installation processing, the device 110 will be in a state in which it can connect with an external server such as the device management server 120. Accordingly, the device 110 will be able to transmit the registration key in relation to the device management server 120. As a result of the registration processing in step S805, the device 110 receives the device identification information from the device management server 120. Next, in step S806, the script execution unit 304 stores in the storage device 203 the device identification information received in step S805 via the server connection management unit 302 and ends the present flowchart. The device 110, by using the device identification information, will be able to use services provided by the device management server 120.

<Script Acquisition Processing by Installation Management Server>

Next, a processing procedure of the script acquisition processing to be executed on the installation management server 150 according to the present embodiment will be described with reference to FIG. 9. The present flowchart is processing of the installation management server 150 corresponding to a request from the device 110 in step S802 in FIG. 8. The present flowchart is executed by the CPU 205 of the installation management server 150 reading the program stored in the storage device 203. The numbers following S indicated below indicate the number of a step of processing included in a flowchart.

In step S901, the installation data management unit 341 acquires a request to acquire installation data from the device 110. The request to acquire installation data includes an installation data ID for specifying the installation data. Also, in addition to the installation data ID, it is assumed that a serial number is to be transmitted from the device 110.

Next, in step S902, the installation data management unit 341 determines whether there is installation data corresponding to the installation data ID designated in step S901. In a case where there is installation data corresponding to the installation data ID, the processing advances to step S903 and in a case where there is no installation data corresponding to the installation data ID, the processing advances to step S907.

Next, in step S903, the installation data management unit 341 determines whether there is registration destination tenant information in the installation data corresponding to the installation data ID designated in step S901. Specifically, the installation data management unit 341 determines whether there is registration destination tenant information in the installation data indicated in Table 6. In a case where there is the registration destination tenant information, the processing advances to step S904, and in a case where there is no registration destination tenant information, the processing advances to step S906. Here, a case where there is no registration destination tenant information is a case where the device 110 for which the installation processing is being executed is not registered to the customer tenant. Accordingly, in step S906, the installation data management unit 341 transmits to the device 110 the installation data corresponding to the installation data ID designated in step S901 without acquiring the registration key and ends the processing. By the installation data being transmitted to the device 110, the automatic installation processing is executed for the corresponding device 110 without performing a registration to a customer tenant.

In a case where there is the registration destination tenant information in step S903, the installation data management unit 341 in step S904 acquires from the device management server 120 a registration key that corresponds to the registration destination tenant ID associated with the installation data via the registration key request unit 342. The installation data here refers to the installation data that is specified by the installation data ID designated in step S901. At that time, the registration key request unit 342 transmits the serial number of the device 110 and the registration destination tenant ID in relation to the device management server 120. The tenant ID is specified from the installation data ID by using Table 6 managed in the installation data management unit 341. A registration key is newly issued by the registration key generation unit 311 on the device management server 120 and is added to the registration key management table indicated in Table 1. In a case where a registration key was already issued and added to Table configuration may be taken so as not to newly issue a registration key. Also, in a case where even if a registration key was already issued but expired due to the expiration date and the like, it is necessary to newly issue a registration key. Also, the serial number of the device 110 and the registration destination tenant ID acquired from the registration key request unit 342 are registered in association in Table 2. Then, in step S905, the installation data management unit 341 transmits to the device 110 a script of the installation data corresponding to the installation data ID designated in step S901 and the registration key issued in step S904 and ends the processing.

Meanwhile, in a case where corresponding installation data could not be specified in step S902, the installation data management unit 341 in step S907 transmits to the device 110 an error to the effect that there is no script of installation data corresponding to the installation data ID designated in step S901 and ends the processing.

<Examples of Screens on Device>

Next, an example of a screen for searching for installation data on the installation management server 150 and acquiring the installation data from the device 110 according to the present embodiment will be described with reference to FIG. 10. A designation screen 1000 illustrated in FIG. 10 is a screen that the device 110 displays on the output I/F unit 201 in the above step S801.

The designation screen 1000 is configured including at least the display regions 1001 and 1002. The display region 1001 is a display region for inputting an ID of a tenant who holds the installation data. The display region 1002 is a display region for inputting a search condition for the installation data. The reason for having a tenant ID inputted when searching for the installation data is to efficiently perform a search for the installation data by narrowing down to only the installation data associated with the inputted tenant ID as a search target.

In the example of FIG. 10, it is possible to select search by installation data ID or search by serial number as a method of searching for the installation data. The serial number "ABC11111" is already stated in the description of the radio button for searching by a serial number. The serial number to be displayed changes according to the device 110 to display the search screen illustrated in FIG. 10.

Figure 8:
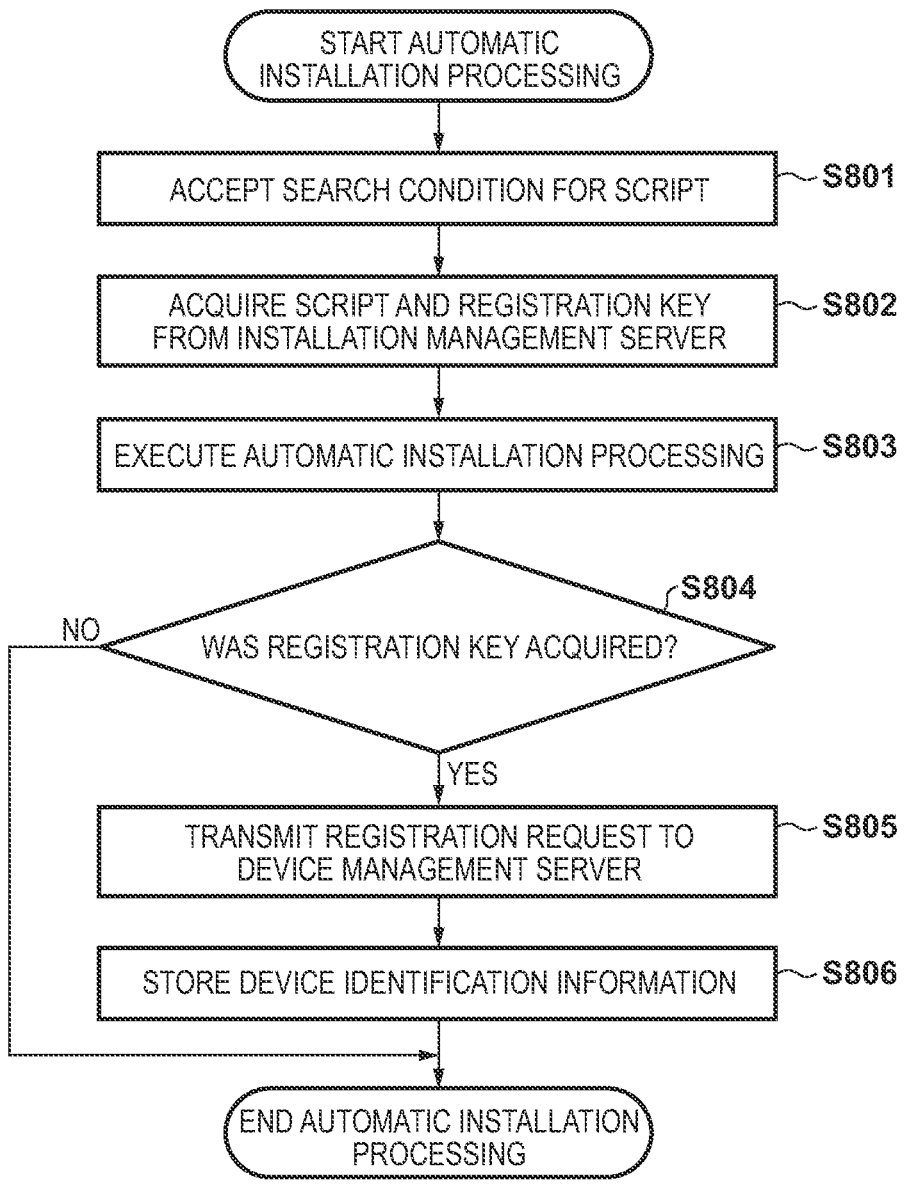
FIG. 8 is a flowchart illustrating processing for automatically installing a device according to one or more aspects of the present disclosure.
Figure 9:
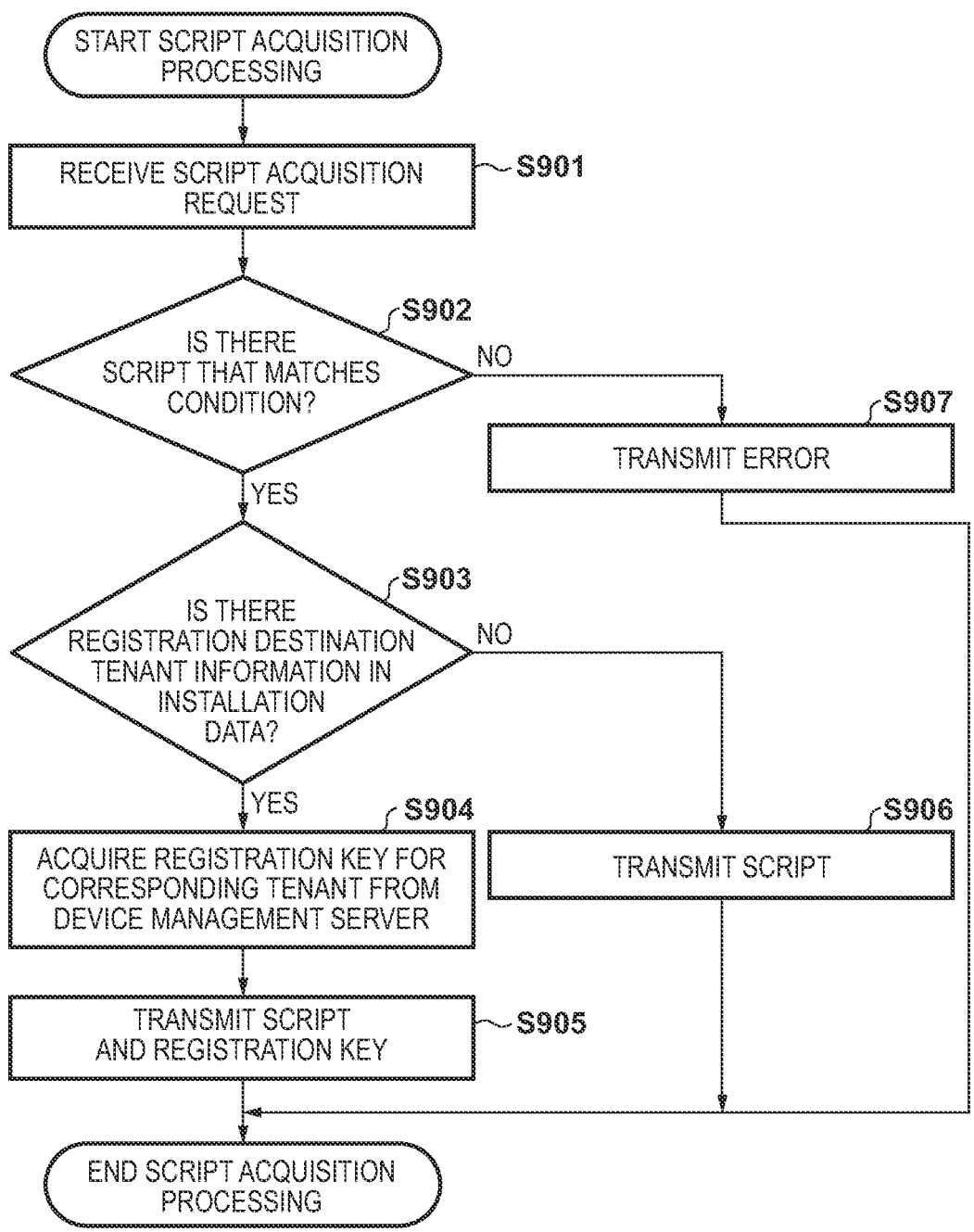
FIG. 9 is a flowchart illustrating processing for acquiring a script of an installation management server according to one or more aspects of the present disclosure.

The search processing and acquisition processing for installation data described in FIG. 8 and FIG. 9 are examples in a case of searching by an installation data ID. In a case where installation data is searched by a device serial number, the device serial number is transmitted to the installation management server 150 from the device 110 in step S802. Also, in step S902, the installation management server 150 determines whether there is installation data associated with the corresponding serial number among the installation data indicated in Table 6. Specifically, in a case where installation data is searched by the serial number "ABC11111", the installation data "1800457359" whose "target device" is "ABC11111" is specified when Table 6 is referenced. Because the installation data is searched by a tenant ID and an installation number or a tenant ID and a serial number, it is assumed that a plurality of pieces of installation data will not be displayed as a search result.

Figure 11:
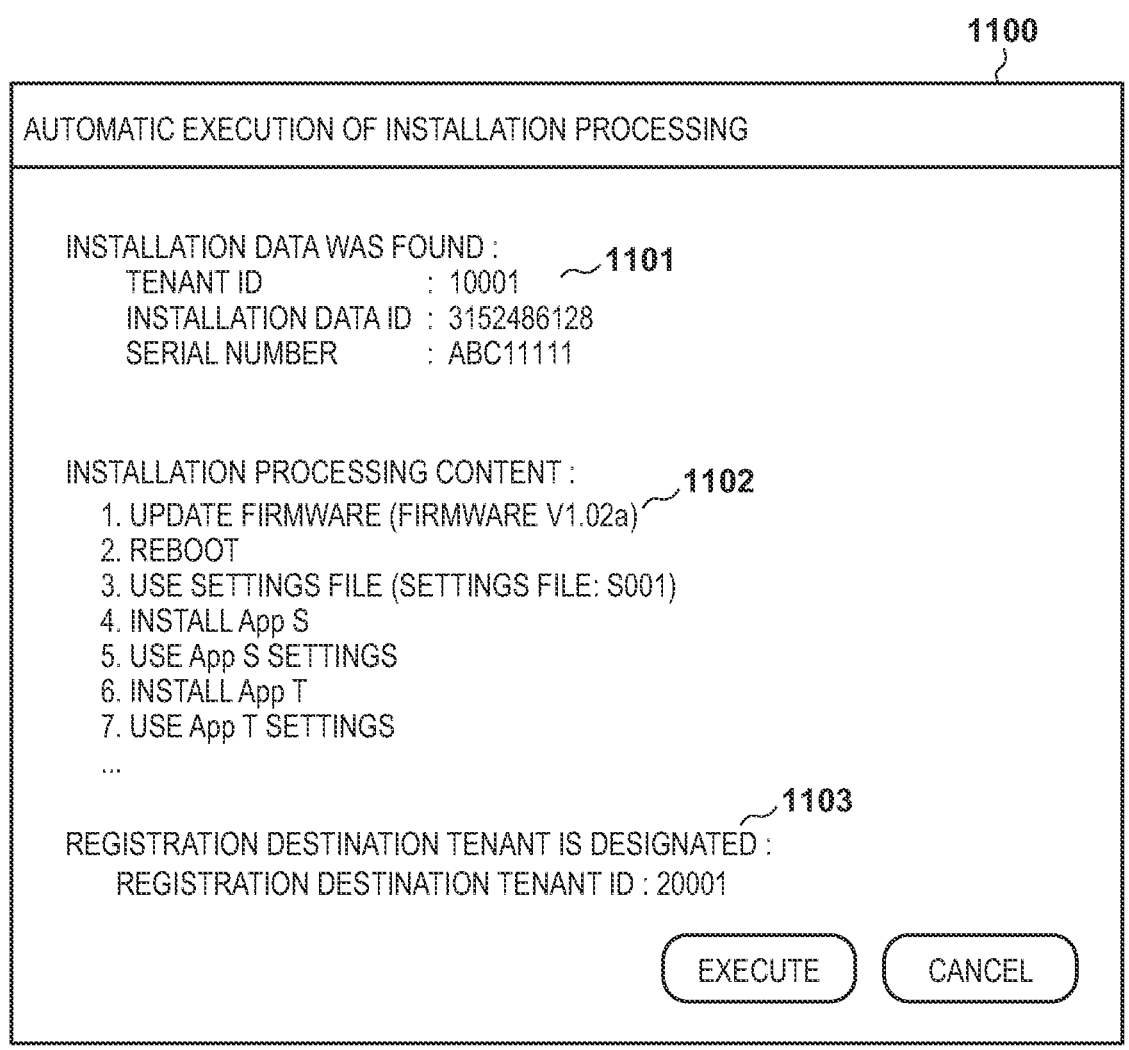
FIG. 11 is a view illustrating an example of an operation screen for when displaying content of the automatic installation processing on the device according to one or more aspects of the present disclosure.

Next, an example of a screen that displays on the device 110 the installation data and the registration key acquired as a search result in step S802 will be described with reference to FIG. 11. A result screen 1100 indicates results of a search by a condition of the tenant ID "10001" and the installation data ID "3152486128" in FIG. 10 in relation to the installation data table of Table 6.

The result screen 1100 is configured including display regions 1101 to 1103. Information related to the installation data received as a processing result in step S802 is displayed in a display region 1101. Specifically, it is information indicated in Table 6. Processing content included in the installation data received as a processing result in step S802 is displayed in a display region 1102. Specifically, it is information indicated in Table 7. By having selected services to use at the registration destination tenant as illustrated in FIG. 5, installation of App S and App T was added as installation processing content. Also, by inputting settings for each application to install as illustrated in FIG. 17, processing for applying setting of App S and App T can be added Information of a registration key received as a processing result in step S802 is displayed in a display region 1103. As for the registration key acquisition result, specifically, in view of security, it is assumed that the registration destination tenant ID of the customer tenant associated with the registration key rather than the registration key itself will be displayed. When an installation worker selects an execute button after having confirmed the setting processing content on the result screen 1100 illustrated in FIG. 11, the processing in step S803 and thereafter is executed by the script execution unit 304.

<Device Registration Processing by Device. Management Server>

Next, the processing procedure of device registration processing on the device management server 120 will be described with reference to FIG. 12. The present flowchart is processing on the device management server 120 in step S805 in FIG. 8. The present flowchart is executed by the CPU 205 of the device management server 120 reading the program stored in the storage device 203. The numbers following S indicated below indicate the number of a step of processing included in a flowchart.

In step S1201, the device registration unit 321 receives a device registration request from the device 110. The registration key and the serial number of the device 110 acquired in step S802 are included in the device registration request. Next, in step S1202, the device registration unit 321 issues the device identification information via the device identification information issuance unit 312. Further, in step S1203, the device registration unit 321 registers the corresponding device 110 in relation to the customer tenant corresponding to the registration key. In other words, a device ID, a tenant ID, and a serial number is added to the device identification information management table indicated in Table 2. Then, in step S1204, the device registration unit 321 transmits to the device 110 the device identification information issued in step S1202 and ends the processing.

After the device registration processing is completed in step S1203, the device 110 performs communication for accessing the device management server 120 at a predetermined timing in order to transmit data such as setting information and operation information. At this time, the server connection management unit 302 of the device 110 transmits to the device management server 120 the device identification information acquired by the device 110 in step S805 and then stored in step S806. Then, the device connection management unit 310 of the device management server 120 performs authentication processing based on the device identification information received from the device 110. When the authentication processing of the device 110 is completed, the device 110 is will be able to use services (services for transmitting setting information and operation information) and the like provided by the device management server 120.

As described above, the system according to the present embodiment includes an information processing apparatus which is a device, an installation management server that manages installation data to be used in the processing for installing the device, and a device management server that manages the installed device and services that are being provided. The present information processing apparatus accepts identification information that identifies a predetermined group which is a customer organization, acquires installation data that is related to the identification information accepted from the installation management server, and executes processing for installing the information processing apparatus in accordance with the acquired installation data. Also, the present information processing apparatus, in a case where a registration key for the device management server that manages the information processing apparatus within a network is included in the installation data, when the installation processing is ended, requests registration of the information processing apparatus to the device management server using the registration key. Also, the installation management server receives via the network from the information processing apparatus the identification information of the above predetermined group and acquires from the device management server the service information that indicates a service that is related to the received identification information. Further, the installation management server acquires from the storage unit the installation data including a script that performs installation of an application that is associated with the corresponding service information and setting of the corresponding application, and provides to the device the acquired installation data. Accordingly, by virtue of the present embodiment, workload of installation workers can be reduced by determining, automatically installing applications and the like that are necessary, and performing suitable settings, on a device to be installed based on a service usage status of a customer organization. Also, a registration key is provided to the information processing apparatus together with the installation data, and the information processing apparatus when the setting processing is ended requests a registration of the device in relation to the device management server. By this, device registration processing can be executed in addition to the processing for automatically installing the device 110. As a result, it becomes no longer necessary for the installation worker to acquire a registration key in advance and to manually input the registration key, and the installation operation burden can be reduced.

Also, by managing applications that need to be installed for each service, it is possible to determine a service to use based on the registration destination tenant information of the installation data and add an instruction to install applications, with suitable settings, that are necessary to use the services. As a result, it ceases to be necessary to manually input an instruction to install applications when generating installation data and the workload of generating installation data can be reduced.

Second Embodiment

Description is given below regarding a second embodiment of the present disclosure. There are cases where when generating installation data, it is yet to be decided to which tenant the device to execute the installation data belongs. If it is yet to be decided to which tenant the device belongs, it means that it is not decided which service to use, in other words, an application that needs to be installed in order to use the service thereof is not decided. In the present embodiment, a configuration for handling such a situation will be described. In the present embodiment, configurations indicated in FIG. 1 to FIG. 4, FIG. 10, and FIG. 12, and Tables 1 to 3, and Table 7 described in the above first embodiment are the same as in the above first embodiment, and therefore, the same reference numerals will be assigned to the same configurations and control and description will be omitted.

<Examples of Screens of Client Terminal>

Examples of screens for when editing the installation data on the client terminal 140 will be described with reference to FIG. 13. A reference numeral 1300 of FIG. 13 indicates an example of an edit screen that is displayed when an edit button of installation data whose installation data ID is "3152486128" is selected on the list screen 410. A difference from the edit screen 500 is in that a check box 1302 for instructing to newly generate, during an installation operation, a registration destination tenant (new predetermined group) of the device 110 and register the corresponding device 110 to the newly generated registration destination tenant is provided. The timing when a registration destination tenant is newly generated is the timing when the installation processing is executed on the device 110 using installation data (installation data ID "3152486128") to be edited on the edit screen 1300. Processing of newly generating a customer tenant is executed on a tenant management server (not shown) to be described later.

Also, another difference from the edit screen 500 is in that usable services are displayed in a reference number 1301 in a state in which a registration destination tenant was not uniquely decided (a plurality of registration destination tenants are included) as indicated in a reference number 1303. Specifically, a list of services which can be used by a tenant when a registration destination tenant is decided when the installation processing is executed is displayed as "Usable Services". In the example of the edit screen 1300, because the tenant that is logged in on the installation management server 150 is tenant ID=10001, three services, ServA, ServB, and ServC, are displayed as services that can be provided to the customer tenants under the tenant in accordance with the example in Table 4. As a result, in accordance with the example in Table 5, three applications, App S, App T, and App U are displayed as additional applications that are necessary in order to use all ServA, ServB, and ServC. At this time, when the setting value edit button 501 is pressed, setting values of three applications, App S, App T, and App U can be edited on a screen 1700 of FIG. 17. The screen for editing the setting values of applications is as illustrated in FIG. 5.

The reference numeral 1310 in FIG. 13 is a registration destination tenant selection screen to be displayed when the selection button of the registration destination tenant is selected in the edit screen 1300. A difference from the selection screen 510 is that it is possible to select a plurality of tenants including a new tenant as registration destination tenants of the device.

In Table 8, an example of an installation data table that is managed by the installation data management unit 341 for when installation data is stored using the settings indicated in FIG. 13 is indicated.

TABLE 8

| Setting Data ID | Tenant ID | Installation Data Name | Settings File | Target Device | Registration Destination Tenant ID |
| --- | --- | --- | --- | --- | --- |
| 3152486128 | 10001 | Company A, for negotiation (for headquarters) | S001 | | 20001, 20005, new |
| 1800457359 | 10001 | Company A, for negotiation (for branch office) | S001 | ABC11111 | 20001 |

TABLE 8-continued

| Setting Data ID | Tenant ID | Installation Data Name | Settings File | Target Device | Registration Destination Tenant ID |
|---|---|---|---|---|---|
| 5807515798 | 10002 | Company B, for negotiation | S003 | | 2002 |

A difference from Table 6 is in holding a value (in the example in Table 8, a text string "new") indicating a plurality of tenant IDs and a new generation of a registration destination tenant as the registration destination tenant ID of the installation data ID "3152486128". Based on the "registration destination tenant ID" of Table 6, content to be displayed on a selection screen 1310 will be decided.

<Automatic Installation Processing by Device>

Figure 14A:
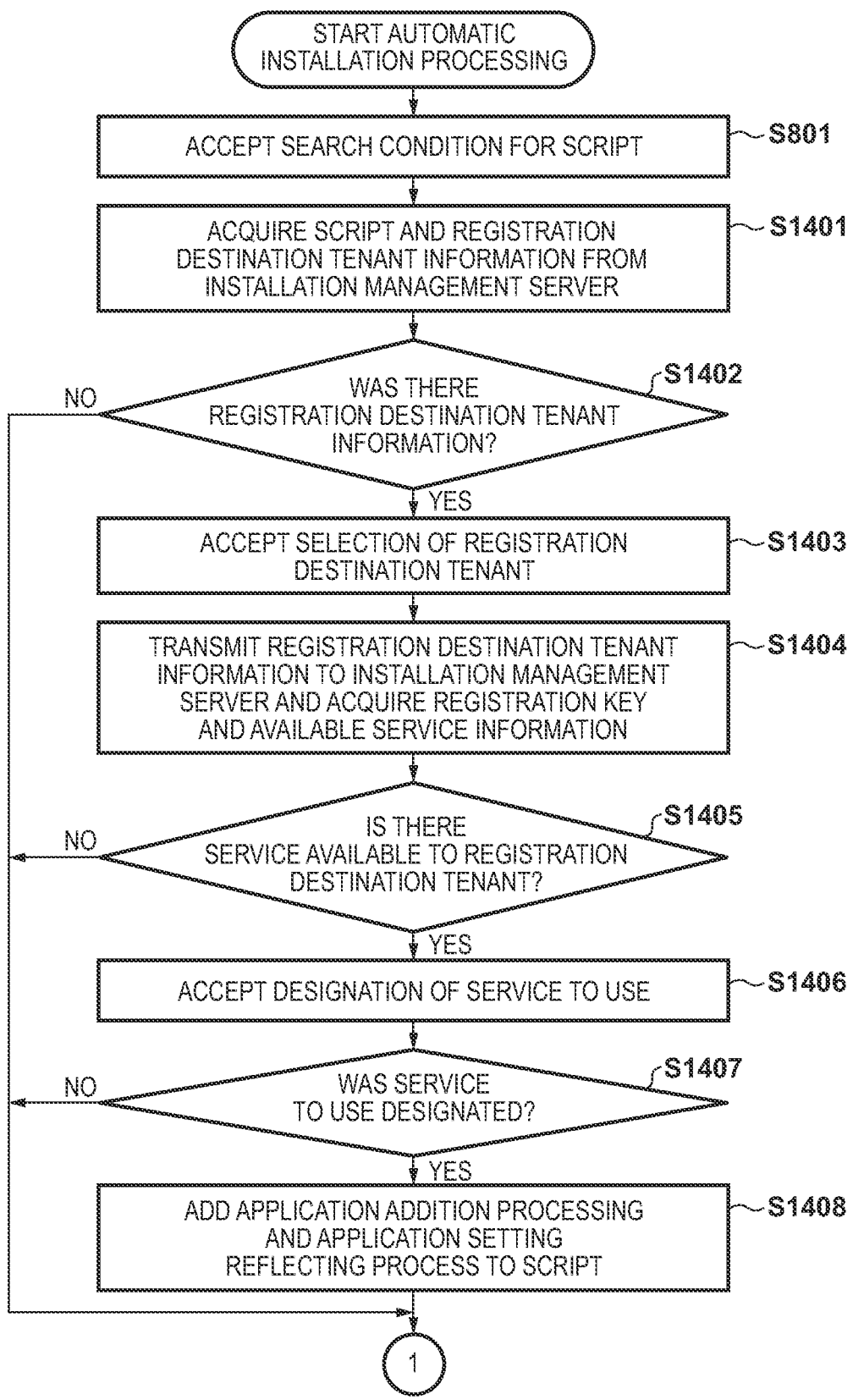
FIGS. 14A and 14B are a flowchart illustrating processing for automatically installing a device according to one or more aspects of the present disclosure.
Figure 14B:
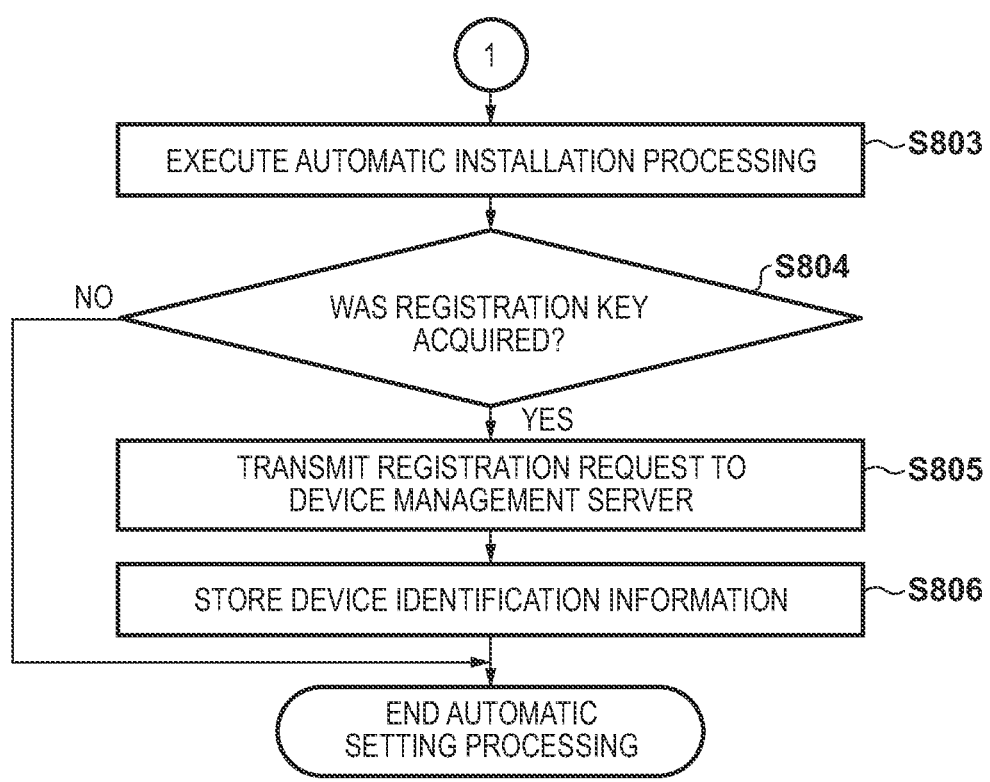

Next, a processing procedure of automatic installation processing of the device 110 according to the present embodiment will be described with reference to FIGS. 14A and 14B. When compared with FIG. 8, it is different in that processing of steps S1401 to S1404 is added. The processing that is the same as FIG. 8 is assigned the same step number and description will be omitted. The numbers following S indicated below indicate the number of a step of processing included in a flowchart.

In step S801, the script acquisition unit 303 acquires information (installation data ID) for specifying the installation data. Then, in step S1401, the script acquisition unit 303 acquires the installation data and the registration destination tenant information from the installation management server 150 using the installation data ID acquired in step S801. There are cases where a plurality of pieces of registration destination tenant information are acquired. Next, in step S1402, the script acquisition unit 303 determines whether the registration destination tenant information could be acquired in step S1401. In a case where it could be acquired, the processing advances to step 1403 and in a case where it could not be acquired, the processing advances to step S803.

In step S1403, the script acquisition unit 303 displays the selection screen 1310 for accepting a selection of a registration tenant via the output I/F unit 201 the registration destination tenant information acquired in step S1401 and accept the selection of the registration destination tenant. Next, in step S1404, the script acquisition unit 303 transmits to the installation management server 150 the registration destination tenant information accepted in step S1403 and acquires a registration key corresponding to the customer tenant specified by the registration destination tenant information and service information that is available to the registration destination tenant. The service information here, similarly to step S1602, is information that the installation management server 150 acquired from the service control unit 377.

Next, in step S1405, the script acquisition unit 303 determines whether the service information could be acquired in step S1401. In a case where at least one piece of service information could be acquired, the processing advances to step S1406 and in a case where not even one piece of service information could be acquired, the processing advances to step S803. Next, in step S1406, the script acquisition unit 303 displays on the input I/F unit 202 the list of service information acquired in step S1404 and accepts the designation of a service to use.

In step S1407, the script acquisition unit 303 determines whether a service to use was designated in step S1406. In a case where at least one service to use was designated, the processing advances to step S1408 and in a case where not even one service was designated, the processing advances to step S803. In step S1408, the script acquisition unit 303 adds to a script an instruction to install applications necessary in order to use the services to use accepted in step S1406 and the processing for applying the settings of the application thereof. Then, the processing in step S803 and thereafter is as indicated in FIG. 8.

<Script Acquisition Processing by Installation Management Server>

Figure 15:
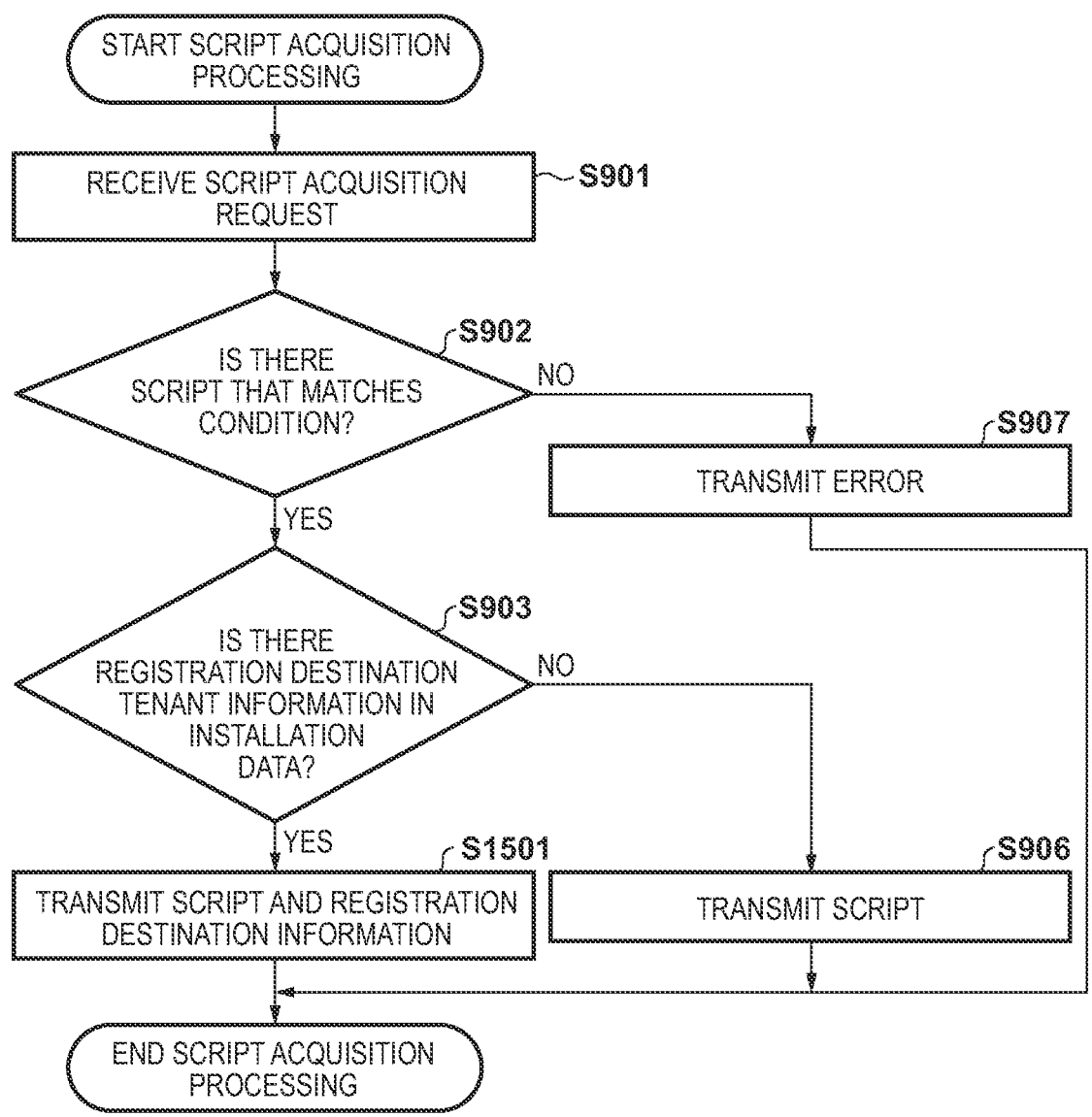
FIG. 15 is a flowchart illustrating processing for acquiring a script for an installation management server according to one or more aspects of the present disclosure.

Next, a processing procedure of the script acquisition processing in the installation management server 150 according to the present embodiment will be described with reference to FIG. 15. The present flowchart is processing of the installation management server 150 in step S1401 in FIG. 14A. When compared with FIG. 9, it is different in that processing of step S1501 is added. The processing that is the same as FIG. 9 is assigned the same step number and description will be omitted.

In a case where it is determined that there is the registration destination tenant information in step S903, the installation data management unit 341, in step S1501, transmits to the device 110 the installation data corresponding to the installation data ID designated in step S901 and the registration destination tenant information associated with the installation data. In a case where the registration destination tenant information is a plurality, a plurality of pieces of registration destination tenant information together with the installation data are transmitted to the device 110. Then, as described above, the selection screen 1310 for having the user select from among a plurality of pieces of registration destination tenant information are displayed.

<Processing for Acquiring Registration Information by Installation Management Server>

Figure 16:
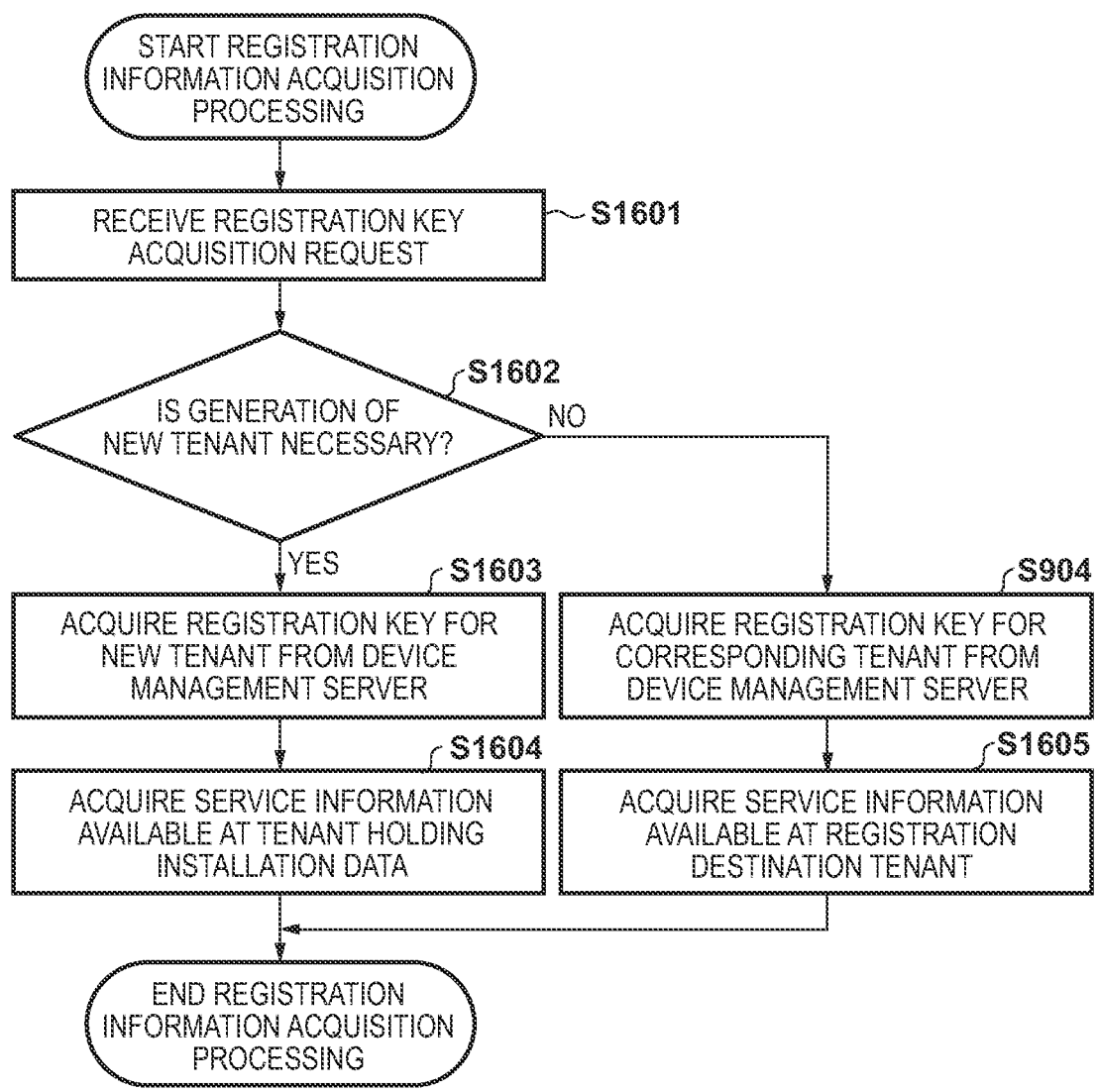
FIG. 16 is a flowchart illustrating processing for acquiring a registration key of an installation management server according to one or more aspects of the present disclosure.

Next, a processing procedure of processing for acquiring registration information on the installation management server 150 according to the present embodiment will be described with reference to FIG. 16. The present flowchart is processing on the installation management server 150 in step S1404 in FIG. 14A. When compared with FIG. 9, it is different in that processing of steps S1601 to S1603 is added. The processing that is the same as FIG. 9 is assigned the same step number and description will be omitted. The numbers following S indicated below indicate the number of a step of processing included in a flowchart.

In step S1601, the installation data management unit 341 receives a request to acquire a registration key from the device 110. Next, in step S1602, the installation data management unit 341 determines whether the registration destination tenant information included in the request to acquire a registration key received in step S1601 is an existing tenant ID or information ("new") that indicates a new tenant. In a case where an acquisition target of the registration key is an existing tenant ID, the processing advances to step S904 and in a case where the acquisition target of the registration key is a new tenant, the processing advance to step 1603.

In step S1603, the installation data management unit 341 acquires from the device management server 120 a registration key related to a new customer tenant via the registration key request unit 342. At this time, the device management server 120, via a tenant management server (not shown), newly generates a customer tenant under a sales tenant to which an installation worker belongs and then issues the registration key related to the customer tenant thereof. Next, in step S1604, the installation data management unit 341 acquires service information that is available to a tenant holding the installation data. This is because it cannot be determined which service to use due to the registration destination of the device 110 being a new customer tenant.

Meanwhile, in step S1605 after step S904, the installation data management unit 341 acquires from the service control unit 322 the service information that is available to the registration destination customer tenant. Note the tenant management server is a server for managing tenant data such as tenant IDs and tenant names. A form may be taken so that functions corresponding to the tenant management server are held by the device management server 120 or the installation management server 150.

<Result Screen (Device)>

Next, an example of a screen in which the device 110 that received a script and registration destination tenant information as a processing result of step S1401 is displaying the content thereof according to the present embodiment will be described with reference to FIG. 17. In a result screen 1700, based on the values inputted into the registration destination tenant ID for the tenant ID "10001" and the installation data ID "3152486128" in relation to the installation data table of Table 6, selection options for the registration destination tenant ID is arranged (the display region 1701). The display region 1701 is the registration destination tenant information that was received as the processing result in step S1401. In the example of FIG. 17, three selection items, registration destination tenant ID=20001, 20005 and newly generate a customer tenant is displayed.

<Selection Screen (Device)>

Next, examples of screens for selecting services to use to be displayed when the execute button is pressed on the result screen 1700 will be described with reference to FIG. 18. When services are selected here, processing for installing applications that are necessary to use the services and processing for applying settings of each application are added to a script by the processing in step S1408.

A reference numeral 1800 is a screen in a case where a tenant ID=20001 is designated to the registration destination tenant in the result screen 1700. As a result of the processing in step S1605, two services, Serv A and Serv B, which are services available to a tenant ID=20001 in Table 4 is made to be selectable by checkboxes.

A reference numeral 1810 is a screen in a case where a new tenant is designated as a registration destination tenant in the result screen 1700. As a result of the processing in step S1604, three services, Serv A and Serv B, which are services available to a tenant ID=10001 in Table 4 is made to be selectable by checkboxes.

Accordingly, by designating a tenant at the time of initial installation, it is possible to install on a device applications for using services associated with the tenant thereof.

As described above, in the present embodiment, by setting a plurality of device registration destination tenants to installation data, it becomes possible to use general-purpose installation data on the devices 110 of a plurality of customer organizations. By this, it is possible to reduce the burden on creators of installation data for managing a plurality of installation data as well as installation workers. Also, by making it possible to newly generate customer organization tenants (new groups) at the time of installation operation, it becomes no longer necessary to generate customer organization tenants in advance prior to installation operation and accordingly, it becomes possible to reduce workload of generating installation data. Further, by making it possible to indicate and designate services that can be used at the registration destination tenant decided at the time of installation operation, it becomes possible to use the same installation data in relation to a plurality of customer organization tenants whose service usage status are different. By this, it becomes possible to reduce the workload of generating installation data.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-070008, filed Apr. 8, 2020, which is hereby incorporated by reference herein in its entirety.

What is claimed is:

1. An information processing apparatus comprising:
at least one memory device that stores a set of instructions; and
at least one processor that executes the set of instructions to:
accept identification information that identifies a predetermined group of a customer organization;
acquire, from an installation management server that manages installation data to use in installation processing of an information processing apparatus, installation data related to the accepted identification information, wherein the installation data includes a script for the installation processing and information related to a plurality of registration destination tenants that can register the information processing apparatus;

accept a registration destination tenant to be registered from among the plurality of registration destination tenants;

acquire, from the installation management server, at least one service corresponding to the accepted registration destination tenant and a registration key used for a registration request to a device management server different from the installation management server;

add a process for installing an application based on the acquired at least one service to the acquired script, wherein the application is an application for the information processing apparatus receiving a service after the registration request to the device management server, and corresponds to the service available under a contract of the accepted registration destination tenant;

control the installation processing of the information processing apparatus by the script;

execute, as the installation processing, installation of an application;

execute, as the installation processing, automatically inputting the registration key; and when the installation processing is ended, transmit the registration request including the automatically inputted registration key to the device management server.

2. The information processing apparatus according to claim 1, wherein at least one of setting information and operation information of the information processing apparatus registered to the device management server is managed on the device management server.

3. The information processing apparatus according to claim 2,
wherein the at least one processor executes instructions in the memory device to:
display on a display unit of the information processing apparatus a designation screen for designating the identification information identifying the predetermined group, and accept the identification information in accordance with a user input via the designation screen.

4. The information processing apparatus according to claim 3,
wherein on the designation screen, search information for searching for the installation data related to the identification information on the installation management server can further be designated, and
on the installation management server, installation data to be searched using search information is narrowed down.

5. The information processing apparatus according to claim 1,
wherein the at least one processor executes instructions in the memory device to:
display, on a display unit of the information processing apparatus, a result screen for indicating an acquisition result of acquiring the installation data.

6. The information processing apparatus according to claim 5,
wherein, on the result screen, processing content of the installation processing and a button that accepts an instruction to execute the installation processing are displayed, and
wherein the at least one processor executes instructions in the memory device to:

when the instruction to execute the installation processing is accepted via the result screen, execute the installation processing.

7. A system comprising:
an information processing apparatus;
an installation management server that manages installation data used in installation processing of the information processing apparatus; and
a device management server that manages the installed information processing apparatus and a service that is being provided,
wherein the information processing apparatus includes:
at least one first memory device that stores a set of instructions; and
at least one first processor that executes the set of instructions to:
accept identification information that identifies a predetermined group of a customer organization;
acquire, from an installation management server, installation data related to the accepted identification information, wherein the installation data includes a script for the installation processing and information related to a plurality of registration destination tenants that can register the information processing apparatus;
accept a registration destination tenant to be registered from among the plurality of registration destination tenants;
acquire, from the installation management server, at least one service corresponding to the accepted registration destination tenant and a registration key used for a registration request to the device management server different from the installation management server;
add a process for installing an application based on the acquired at least one service to the acquired script, wherein the application is an application for the information processing apparatus receiving a service after the registration request to the device management server, and corresponds to the service available under a contract of the accepted registration destination tenant;
control the installation processing of the information processing apparatus by the script;
execute, as the installation processing, installation of an application;
execute, as the installation processing, automatically inputting the registration key; and
when the installation processing is ended, transmit the registration request including the automatically inputted registration key to the device management server; and
the installation management server includes:
a storage unit that stores installation data;
at least one second memory device that stores a set of instructions; and
at least one second processor that executes the set of instructions to:
receive identification information of a predetermined group via a network from the information processing apparatus;
provide the script and the information related to a plurality of registration destination tenants;
receive the accepted registration destination tenant;
acquire, from the device management server, service information that indicates a service related to the received registration destination tenant and a registration key for registering an information processing apparatus to the device management server; and acquire installation data that includes the script and provide the acquired installation data and the registration key to the information processing apparatus.

8. A method of controlling an information processing apparatus, the method comprising:
   accepting identification information that identifies a predetermined group of a customer organization;
   acquiring, from an installation management server that manages installation data to use in installation processing of an information processing apparatus, installation data related to the accepted identification information, wherein the installation data includes a script for the installation processing and information related to a plurality of registration destination tenants that can register the information processing apparatus;
   accepting a registration destination tenant to be registered from among the plurality of registration destination tenants;
   acquiring, from the installation management server, at least one service corresponding to the accepted registration destination tenant and a registration key used for a registration request to a device management server different from the installation management server;
   controlling the installation processing of the information processing apparatus by the script;
   executing, as the installation processing, installation of an application;
   executing, as the installation processing, automatically inputting the registration key; and
   when the installation processing in the execution is ended, transmitting the registration request including the automatically inputted registration key to the device management server.

9. A method of controlling a system that includes an information processing apparatus, an installation management server that includes a storage unit that stores installation data used in installation processing of the information processing apparatus, and a device management server that manages the installed information processing apparatus and a service that is being provided,
   the information processing apparatus comprising:
   accepting identification information that identifies a predetermined group of a customer organization;
   acquiring by a first acquisition, from an installation management server, installation data related to the identification information accepted by the acceptance, wherein the installation data includes a script for the installation processing and information related to a plurality of registration destination tenants that can register the information processing apparatus;
   accepting a registration destination tenant to be registered from among the plurality of registration destination tenants;
   acquiring, from the installation management server, at least one service corresponding to the accepted registration destination tenant and a registration key used for a registration request to the device management server different from the installation management server;
   adding a process for installing an application based on the acquired at least one service to the acquired script, wherein the application is an application for the information processing apparatus receiving a service after the registration request to the device management server, and corresponds to the service available under a contract of the accepted registration destination tenant;
   controlling the installation processing of the information processing apparatus by the script;
   executing, as the installation processing, installation of an application;
   executing, as the installation processing, automatically inputting the registration key; and
   when the installation processing in the execution is ended, transmitting the registration request including the automatically inputted registration key to the device management server, and
   the installation management server comprising:
   receiving identification information of a predetermined group via a network from the information processing apparatus;
   providing the script and the information related to a plurality of registration destination tenants;
   receiving the accepted registration destination tenant;
   acquiring, by a second acquisition and from the device management server, service information that indicates a service related to the received registration destination tenant and a registration key for registering an information processing apparatus to the device management server; and
   acquiring installation data that includes the script and providing the acquired installation data and the registration key to the information processing apparatus.

10. A non-transitory computer-readable storage medium storing a computer program for causing a computer to execute each step of a control method for an information processing apparatus, the method comprising:
   accepting identification information that identifies a predetermined group of a customer organization;
   acquiring, from an installation management server that manages installation data to use in installation processing of an information processing apparatus, installation data related to the accepted identification information, wherein the installation data includes a script for the installation processing and information related to a plurality of registration destination tenants that can register the information processing apparatus;
   accepting a registration destination tenant to be registered from among the plurality of registration destination tenants;
   acquiring, from the installation management server, at least one service corresponding to the accepted registration destination tenant and a registration key used for a registration request to a device management server different from the installation management server;
   adding a process for installing an application based on the acquired at least one service to the acquired script, wherein the application is an application for the information processing apparatus receiving a service after the registration request to the device management server, and corresponds to the service available under a contract of the accepted registration destination tenant;
   controlling the installation processing of the information processing apparatus by the script;
   executing, as the installation processing, installation of an application;
   executing, as the installation processing, automatically inputting the registration key; and
   when the installation processing in the execution is ended, transmitting the registration request including the automatically inputted registration key to the device management server.

* * * * *